United States Patent
Brogårdh

(10) Patent No.: US 7,272,524 B2
(45) Date of Patent: Sep. 18, 2007

(54) METHOD AND A SYSTEM FOR PROGRAMMING AN INDUSTRIAL ROBOT TO MOVE RELATIVE TO DEFINED POSITIONS ON AN OBJECT, INCLUDING GENERATION OF A SURFACE SCANNING PROGRAM

(75) Inventor: Torgny Brogårdh, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/542,007

(22) PCT Filed: Dec. 17, 2003

(86) PCT No.: PCT/SE03/02003

§ 371 (c)(1),
(2), (4) Date: Jul. 11, 2005

(87) PCT Pub. No.: WO2004/071717

PCT Pub. Date: Aug. 26, 2004

(65) Prior Publication Data

US 2006/0181236 A1 Aug. 17, 2006

(30) Foreign Application Priority Data

Feb. 13, 2003 (SE) .................................. 0300409

(51) Int. Cl.
*G05B 19/18* (2006.01)
*G05B 19/19* (2006.01)
*G05B 19/404* (2006.01)
*G06F 19/00* (2006.01)

(52) U.S. Cl. .................. 702/95; 700/70; 700/193; 700/194; 702/85; 702/94; 901/2; 901/50

(58) Field of Classification Search ................. 700/71, 700/159, 160, 161, 182, 193, 194; 702/85, 702/94, 95, 150; 901/2, 14, 15, 16, 17, 18, 901/46, 49, 50; 703/1, 2
See application file for complete search history.

(56) References Cited

U.S. PATENT DOCUMENTS 2,927,258 A * 3/1960 Lippel ......................... 318/39

(Continued)

FOREIGN PATENT DOCUMENTS

JP 2003-211376 A * 7/2003

(Continued)

OTHER PUBLICATIONS

Claus Brenner, Jan Böhm and Jens Gühring; CAD-Based Object Recognition for a Sensor/Actor Measurement Robot; CAD-based Object Recognition for a Sensor/Actor Measurement Robot, in: 'IAPRS', vol. 32/5, ISPRS, Hakodate, Japan, pp. 209-216 (1998).
Böhm et al., Automated Extraction of Features from CAD Models for 3D Ojbectrecognition; ISPRS, vol. XXXIII, Amsterdam; 2000.

* cited by examiner

*Primary Examiner*—Edward Cosimano
(74) *Attorney, Agent, or Firm*—Venable LLP; Eric J. Franklin

(57) ABSTRACT

A method and a system for programming an industrial robot to move relative to defined positions on an object. The system includes a geometrical model of the object, the real object, and an industrial robot. A plurality of measuring points are generated corresponding to different points on the surface of the real object expressed in a coordinate system associated with the robot. The system further includes a calibration module arranged to determine orientation and position of the geometrical model of the object relative to the coordinate system associated with the robot, a calculating module arranged to calculate the deviation between the measuring points and corresponding points on the geometrical model, and an adjusting module arranged to adjust the defined positions based on the calculated deviations.

35 Claims, 17 Drawing Sheets

U.S. PATENT DOCUMENTS

| | | | |
|---|---|---|---|
| 3,543,910 A * | 12/1970 | Martin et al. | 414/728 |
| 4,670,849 A * | 6/1987 | Okada et al. | 700/87 |
| 4,831,549 A * | 5/1989 | Red et al. | 700/254 |
| 6,134,506 A | 10/2000 | Rosenberg et al. | |
| 6,256,546 B1 * | 7/2001 | Graham et al. | 700/30 |
| 6,269,284 B1 * | 7/2001 | Lau et al. | 700/193 |
| 6,509,576 B2 * | 1/2003 | Woo-Dong | 250/559.33 |
| 2002/0038855 A1 * | 4/2002 | Hwang | 250/559.29 |
| 2003/0085891 A1 * | 5/2003 | Lyons et al. | 345/420 |
| 2004/0172168 A1 * | 9/2004 | Watanabe et al. | 700/264 |
| 2005/0273202 A1 * | 12/2005 | Bischoff | 700/263 |
| 2006/0025890 A1 * | 2/2006 | Nagatsuka et al. | 700/253 |
| 2006/0181236 A1 * | 8/2006 | Brogardh | 318/568.1 |

FOREIGN PATENT DOCUMENTS

| | | |
|---|---|---|
| WO | WO97/43703 A1 * | 11/1997 |
| WO | WO 2004/071717 A1 * | 8/2004 |

METHOD AND A SYSTEM FOR PROGRAMMING AN INDUSTRIAL ROBOT TO MOVE RELATIVE TO DEFINED POSITIONS ON AN OBJECT, INCLUDING GENERATION OF A SURFACE SCANNING PROGRAM

CROSS-REFERENCE TO RELATED APPLICATIONS

This application claims priority to Swedish patent application 0300409-0 filed 13 Feb. 2003 and is the national phase under 35 U.S.C. § 371 of PCT/SE2003/002003 filed 17 Dec. 2003.

TECHNICAL AREA AND PRIOR ART

The present invention relates to a method, a system, a computer program, and a computer readable medium comprising a computer program for programming an industrial robot to move relative to defined positions on an object, wherein the programming is based on a geometric model of the object. The object can either be a working object, a fixture, a grip device, or a tool. The invention is particularly useful in connection with programming of a robot path comprising a plurality of defined positions on the object, for example for painting, grinding, milling, welding, or gluing. However, the invention is also useful for programming individual positions, for example for spot welding or object gripping.

It is well known technology to program an industrial robot using a CAD model of the object. The positions of the robot path are received from the CAD model. However, those positions have to be corrected with regard to geometric and kinematic errors of the robot, the tool, and the work object. Examples of such errors are deviations between the real object and the model, an error in the positioning of the robot relative to the surrounding, arm length errors, shaft attitude error, and shaft offset error of the robot. To be able to perform such a correction today, the robot has to be calibrated with high accuracy.

Today, the accuracy of the robot is a huge problem when using the robots. It is very expensive to build a high-accuracy robot, in which each component is carefully measured, and the kinematic parameters of the robot are calibrated by means of a laser measuring system. Calibration by means of laser and camera measuring systems exists, but are seldom used. Only the large car manufactures have an economy, and personnel, to be able to handle such a complex technology. As long as there does not exist any simple and inexpensive method for calibrating and programming industrial robots, those will only be used in companies having enough financial and personnel resources.

OBJECT AND SUMMARY OF THE INVENTION

The object of the present invention is to provide a method and a system to simplify calibration and programming of a robot.

According to an aspect of the invention this object is achieved by a method characterized in that is comprises registering and storing a plurality of measuring points, each measuring point corresponding to a point on the surface of the real object expressed in any coordinate system associated with the robot. Determining the orientation and position of a geometric model of the current object relative to said coordinate system associated with the robot by adapting the geometrical model of the object and the measuring points to each other. For at least some of the measuring points the deviation between the measuring points and the corresponding points on the geometrical model are measured and said defined positions are adjusted based on said calculated deviations. The measuring points correspond to the positions of the robot when a predefined point on a tool, or on a measuring device corresponding to the current tool, measures different points on the surfaces of the object.

By adapting measured values for the real object to the geometrical model of the object and then adjust the positions, to which the robot is to be moved, in dependence of the deviations between the measured values and the model, it is possible to compensate a robot path for all geometric and kinematic errors in a robot cell. Both calibration and programming are done by an intuitive method without having to write any robot program or show any robot program to the operator. There is no need for extra measuring equipment for measuring kinematic errors, the tool coordinate system and the object coordinate system. Instead, the operator uses the robot for the measuring and the measuring is very simple. The measuring can either be performed automatically, or the operator points with the tool, or with a particularly adapted measuring device, on different surfaces and/or edges of the object to be calibrated. The robot program can then be generated automatically by a CAD system or feed by lead through by the operator. Lead through means that the operator simply moves the tool along the path, which is later to be executed by the robot. The method can also be useful for programming of fixtures, conveyors and other manipulators, which shall cooperate with the robot.

According to a preferred embodiment of the invention the method comprises calculating one or a plurality of characteristic parameters for a plurality of different parts of the object based on the geometrical model of the object. To which part of the object a measuring point belongs is determined based on said characteristic parameters, and said adapting of the geometrical model of the object to the measuring points comprises adapting measuring points belonging to a certain part of the object to corresponding part of the geometrical model. It is advantageous if said parts comprise surfaces and edge lines of the object. It is advantageous if said characteristic parameters comprise the normal direction relative to the surface of the object and the bending of the surface of the object. It is advantageous to adapt the geometrical model of the object and the measuring points to each other by minimizing the distance between the measuring points and corresponding points on the geometrical model of the object. By first determining to which part of the object each measuring point belongs, and then adapting one part at a time the adaptation is simplified.

According to a preferred embodiment of the invention, the method comprises providing geometric models for a plurality of different objects, calculating a plurality of characteristic parameters for each of the objects based on the geometrical model of the object and determining to which of the objects the measuring points belong, based on the measuring points and said characteristic parameters. It is advantageous if said characteristic parameters comprise the normal direction relative to the surface of the object and the bending of the surface of the object. In that way the system automatically identifies the object and determines which geometric model to be used during programming. In an alternative embodiment the operator himself feeds information about which object to be used during programming.

According to a preferred embodiment of the invention the surfaces of the object are divided into a plurality of subsurfaces, each comprising at least one measuring point, calculating a correction vector based on the deviation between the measuring point/points on the subsurface and corresponding point/points on the geometrical model of the object, and adjusting said defined positions based on the correction vectors for the subsurfaces belonging to the positions. It is advantageous to calculate the correction vector for a subsurface by calculating an average value of the deviations for all measuring points in the subsurface. An advantage with dividing the surfaces into subsurfaces, and to use a plurality of measuring values to calculate a correction vector for each subsurface, is that noise and occasional variations in the measuring values are filtered away.

According to a preferred embodiment of the invention the edge lines of the object are divided into a plurality of line segments, each comprising at least one measuring point, calculating a correction vector based on the deviation between the measuring point/points in the line segment and corresponding point/points on the geometrical model of the object, and adjusting said defined positions based on the correction vectors for line segments in the vicinity of the defined positions. It is advantageous to calculate the correction vector of a line segment as an average value of the deviations for all measuring points on the line segment. An advantage with dividing the edge lines into lines segments, and to use a plurality of measuring values for calculating a correction vector for each subsurface, is that noise and occasional variations in the measuring values filtered away.

According to a preferred embodiment of the invention, said defined positions are defined relative to the geometrical model and the defined positions are transformed to said coordinate system associated with the robot, based on the determined orientation and position of the geometrical model relative to the coordinate system associated with the robot. In an embodiment of the invention the definition of the positions, which the robot is about to run through, done in a CAD system and the positions are positioned on the model of the object. Accordingly, the positions are defined in the object coordinate system. To make it possible to program the robot so that it moves to those positions, the positions have to be transformed to a coordinate system associated with the robot. This transformation is given by the earlier determined orientation and position of the geometrical model relative to the coordinate system associated with the robot.

According to an embodiment of the invention, the measuring points are generated by the operator moving the robot so that the current tool, or a corresponding measuring device, will be in contact with the surfaces of the object. The measuring points correspond to positions of the robot when the tool, or a measuring device corresponding to the current tool, is in contact with different points on the surface of the object. This method is suitable for a robot having a low movable mass, which makes it possible for the operator to move the robot to the desired positions by using his hand. However, most industrial robots today have a high movable mass, and to fulfill the security demands during measuring a separate programming box having "dead man's control" has to be used, which means that generating measuring points with this method takes too long time.

According to an embodiment of the invention, the method comprises generating a surface scanning program for automatic control of the movements of the robot during measuring of said measuring points. Thereby, the operator does not have to move the robot to the measuring points, instead the movements of the robot are automatically controlled by the surface scanning program. Thanks to the automatic surface scanning program, the measuring points are quickly generated, and the safety of the operator is also guaranteed.

According to an embodiment of the invention the sensor is mounted on the tool, or on a member corresponding to the current tool, and the sensor cooperates with the robot during generation of said measuring points. Since the measuring points are generated the before the robot is calibrated, the exact position of the robot relative to the object is not known, and thus there is not possible to control the robot exact to contact with the surface of the object, without having any feed back. To solve this problem some kind of sensor that cooperates with the robot is used for generating the measuring points. For example, a sensor could be used that provides a signal to the robot when being in contact with the surface of the object. When receiving that signal, the robot interrupts its motion. The measuring points correspond to the positions of the robot when the sensor is in contact with the surfaces of the object. This method is called "find and stop".

Another suitable type of sensor is a positioning sensor, which is adapted for measuring the distance between the surface of the object and some part of the robot, preferably the tool holder of the robot. In such a way the determination of the position of a measuring point can be carried out with the robot at a distance from the object. During measuring, the robot is moved to a position in the vicinity of the measuring point. The distance between the robot and the measuring point is measured by the sensor, thereafter the position of the measuring point is determined based on the position of the robot during the measuring and the measured distance between the robot and the surface of the object.

According to an embodiment of the invention the programmed movement comprises that the robot is moved so that the sensor is in contact with the surface of the object during the measuring and that the robot thereafter is moved to a transfer point positioned at a distance from the surface of the object. This embodiment is useful when using a sensor measuring the contact between the sensor and the object. The measuring starts from a position a distance from the surface of the object, and the robot is then moved in a direction towards the surface until it reaches the intended position, or until contact with the sensor.

According to an embodiment of the invention, the orientation of the current tool is stored in the defined positions, and the program is generated so that the tool, or the measuring device corresponding to the tool, has about the same orientation in the measuring point as the stored orientation. To minimize the influence of the kinematic errors of the robot on the difference between the measured surfaces of the object and the defined positions, the surface scanning program is generated with the same orientation of the tool as should later be used in the process program.

According to an embodiment of the invention, the positions of the measuring points are determined off-line based on the geometrical model of the object. The positions of the measuring points are advantageously determined in the same CAD-system, as in which the geometrical model of the object is stored. An advantage with this embodiment of the invention is that the surface scanning program can be generated without using the robot. Thus, it is possible to, easily and with high accuracy, find optimum positions and orientations for the measuring points. During calibration, the object surfaces are quickly measured, which means that the time the robot has to stand still for calibration is short.

According to a further embodiment of the invention, the method comprises measuring a plurality of positions, comprising at least one start position and one stop position, on the surface of the real object, and automatically generating the positions of the measuring points based on the measured positions. Preferably, said plurality of positions is measured by means of the robot. An advantage with this embodiment is that the operator can specify within which range the surface scanning program should generate measuring points. Thus, an uncertain zone along the edges of the object, in which zone it is uncertain weather the sensor will hit the object or not during the measuring, is avoided.

According to a further aspect of the invention, this object is achieved by a computer program directly loadable into the internal memory of the computer, which computer program comprises instructions to make the processor perform the steps in the method according to the invention when said computer program is run on the computer. The computer program is provided for example on a computer readable medium or via a network, such as the Internet. A computer program according to the invention can either be executed by a processor in the control system of the robot, in the CAD system, or in a separate computer.

According to a further aspect of the invention, this object is achieved by computer readable medium comprising computer program comprising instructions for making a processor to perform the steps in the method according to the invention when said computer program is run on the computer.

According to a further aspect of the invention, this object is achieved by a system for programming an industrial robot to move relative to defined positions on an object, wherein the system comprises a geometric model of the object, which system is characterized in that it further comprises the real object, an industrial robot, wherein the real object and the robot are arranged so that it is possible to, by means of the robot, generate a plurality of measuring points corresponding to different points on the surface of the real object expressed in any coordinate system associated to the robot, a calibration module, arranged to determine the orientation and position of the geometrical model relative to said coordinate system associated with the robot, by adapting the measuring points to the geometrical model of the object, a calculating module arranged for calculating deviations between the measuring points and corresponding points on the geometrical model, and an adjusting module arranged for adjusting said defined positions based on said calculated deviations.

According to a preferred embodiment of the invention, the system comprises a measuring device adapted to being in contact with the surface of the object during measuring, wherein the measuring device has a centre point corresponding to the tool centre point (TCP) for the current tool. To facilitate the measuring, the system comprises a measuring device, for example a measuring tip, which during the measuring either replaces the tool, or is provided on the tool. The tool centre point of the measuring device should be the same as the tool centre point of the tool.

According to a preferred embodiment of the invention, the measuring device is adapted to, during contact with the object, submit a signal, and the system is adapted to, in reply to said signal, generate at least one measuring point based on the position of the robot. To facilitate the measuring, a signal is generated when the measuring device is in contact with the surface of the object, wherein the position of the robot is read at contact between the measuring device and the surface of the object.

SHORT DESCRIPTION OF THE DRAWINGS

The present invention will now explained by the description of different embodiment examples and with reference to the appended figures.

DETAILED DESCRIPTION OF PREFERRED EMBODIMENTS

Figure 1:
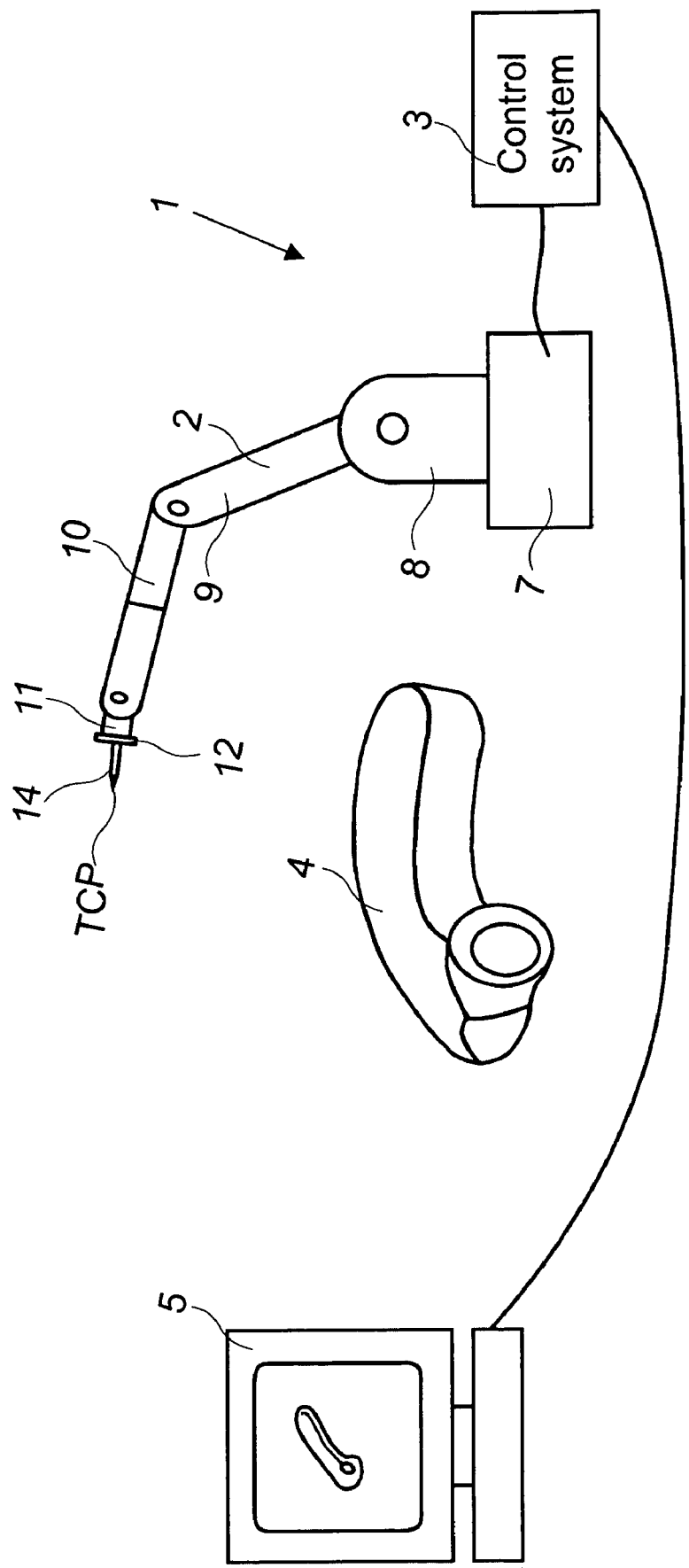
FIG. 1 shows a system for programming an industrial robot according to an embodiment of the invention.

FIG. 1 shows an example of a system for programming an indus-trial robot according to the invention. The system comprises an industrial robot 1, from now on denoted the robot, which comprises a manipulator 2, and a control system 3 for controlling the movements of the robot. The control system comprises a model of the kinematic of the robot. The system further comprises a work object 4, on which the robot is about to perform some kind of process, for example welding, painting or grinding. Further, the system comprises a computer 5, in which the software of the invention is stored, and in which the software is executed. The robot, as shown in the figure, is an industrial robot having six axes, and comprising a base 7 fixedly mounted on a foundation and a stand 8, which is rotatable in relation to the base about a first axis. In the upper end of the stand, a first robot arm 9 is rotateably mounted in relation to the stand about a second axes. In the outer end of the first arm, a second arm 10 is rotatably mounted in relation to the first arm about a third axes. The second robot arm comprises two parts, wherein the outer part is rotateable in a relation to the inner part about a fourth axes. The second arm 10 carries in its outer end a tilt member 11, which is rotatable about a fifth axes. The robot also comprises a tool holder 12, which is rotatable in relation to the tilt member about a sixth axes.

A measuring device is mounted on the tool holder, which measuring device comprises a measuring tip 14. The outer end of the measuring device is formed as a tip and forms the measuring tip 14. The outer part of the measuring tip is intended for being brought into contact with the surface of the object 4. The TCP ("Tool Center Point") of the measuring device shall be the same as TCP for the tool to be used during the process. Alternatively, the measuring tip can be mounted directly on the tool to be used. During arc welding, the measuring tip is mounted on the welding pistol with the outermost part of the tip in the position where the welding arc normally ends. During polishing, a dummy axis, provided with a measuring tip, is mounted in the spider keeper, instead of the polishing tool. The TCP of the measuring tip shall be the same as TCP for the polishing tool, which normally is in the center of the polishing wheel. To facilitate the measuring, an electric signal can be connected between the measuring tip and the current object, and the robot position is read when connection is made, i.e. when the measuring tip is in contact with the surface or the edge to be measured.

During measuring, the measuring tip 14 is moved forward and backward over the accessible surfaces of the object. From now on a surface on an object is denoted an object surface. The orientation of the tool is about the same way as for the current process. For example, in the polishing case the pad is kept perpendicular to the surfaces to be measured. To be able to compensate the appropriate kinematic errors, it is important to keep the tool orientation about the same as in the current process. The more measuring points received, the better will the calibration be. To obtain a satisfactory result, at least three points should be measured for each object surface, and at least two points should be measured for each edge line on the object. The control system of the robot calculates the positions of the measuring points in the base coordinate system of the robot. In an alternative embodiment, the control system calculates a position in any other coordinate system, which is associated with the robot. The measuring is done by means of a kinematic model of the robot.

It is an advantageous if the robot has a control mode for manual (lead through) positioning. This means that the robot operator easily can position and orientate the tool, or the work object, carried by the robot by gripping the tool, or the object, with his hands. One possibility to directly manipulate the robot, i.e. without using a programming box with a joystick, is to introduce a force sensor coupled to a control algorithm in the control system that converts the hand power of the operator to robot movements. For this purpose, the robot has to be entirely safe so that the operator will not be hurt due to an error. One possibility to fulfill this obligation is to use a parallel kinematic robot having such a low arm weight that the robot during maximum engine power and speed cannot seriously hurt the operator. Meanwhile, there should be redundant systems for error detection in the control system.

Figure 2:
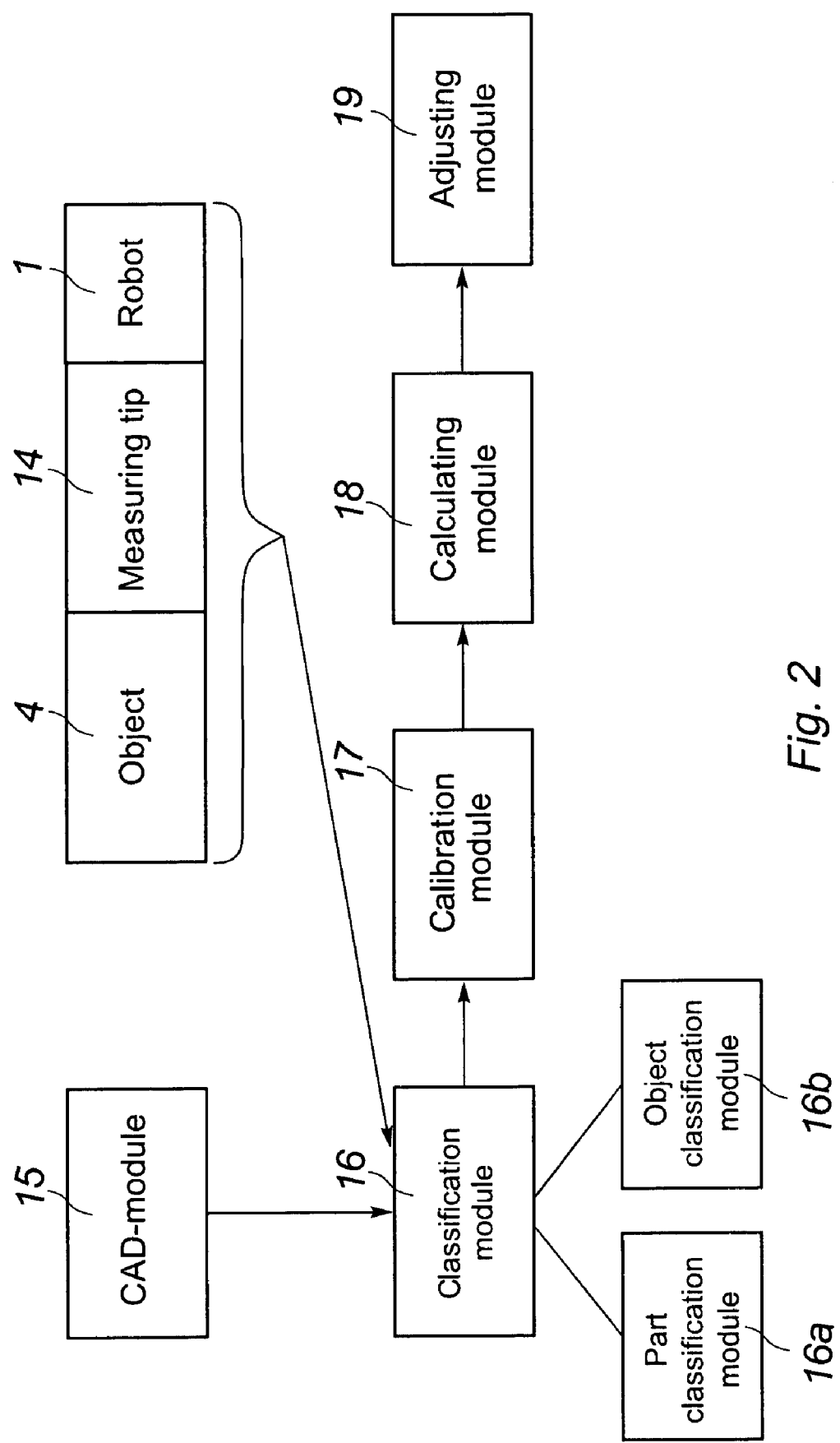
FIG. 2 shows a block diagram over the system according to an embodiment of the invention.

FIG. 2 shows a block scheme of the modules included in the system. Besides the robot 1, the measuring tip 14 and the object 4, the system comprises a CAD-module 15, providing geometric models of different work objects and tools, a classification module 16, which comprises a part classification module 16a, which determines to which part of the object a particular measuring point belongs, and an object classification module 16b, which determines to which object, or tool, the measuring points belong, a calibration module 17, which determines the orientation and position of the geometrical model relative to the robot, a calculating module 18, which determines the deviation between the measuring points and corresponding points on the geometrical model, and calculates the correction vectors that are used later for correcting the defined positions to which the robot is to be moved, when carrying out the process, and an adjusting module 19, which is arranged to adjust the defined positions on the object, to which the robot is be moved, in dependence of the correction vectors.

The positions of the measuring points, in any of the coordinate systems of the robot, are calculated in the control system of the robot based on the kinematic model and the location of the axes of the robot at the measuring time. The measuring points are later transferred from the control system to the classification module 16 for further processing.

In the CAD-module 15 there are geometric models of a plurality of different work objects, and tools to be used in the current robot cell. The geometrical models consist of CAD models. In the CAD models each point on the surface of the object can be calculated from for example "spline" functions, line equations or surface equations. In each point on the surface of the object it is possible to, by means of surrounding points on the surface of the object, calculated such characteristic parameters as the normal direction of the surface, and the bending of the surface in different directions. In discontinuous junctions between different surfaces, the points in edge lines can be provided with special characteristic, such as direction of the line, bending of the line and designations of connected surfaces. These are examples of possibilities to make surface points unique.

To make surfaces unique, parameters characterizing the points on the surfaces may be used, for example the average normal angle, the spreading in the normal direction, the surface area, the average bending of the surface. In the same way, the edge lines can be made unique with parameters for average direction, average bending, length of the line etc. For an entire object the relations between the defined surface and the edge lines can be used, for example which normal directions are represented, how the normal directions of the surfaces are related to each other, which surfaces are delimited by the edge lines, and the relation between different directions of edge lines.

Figure 3:
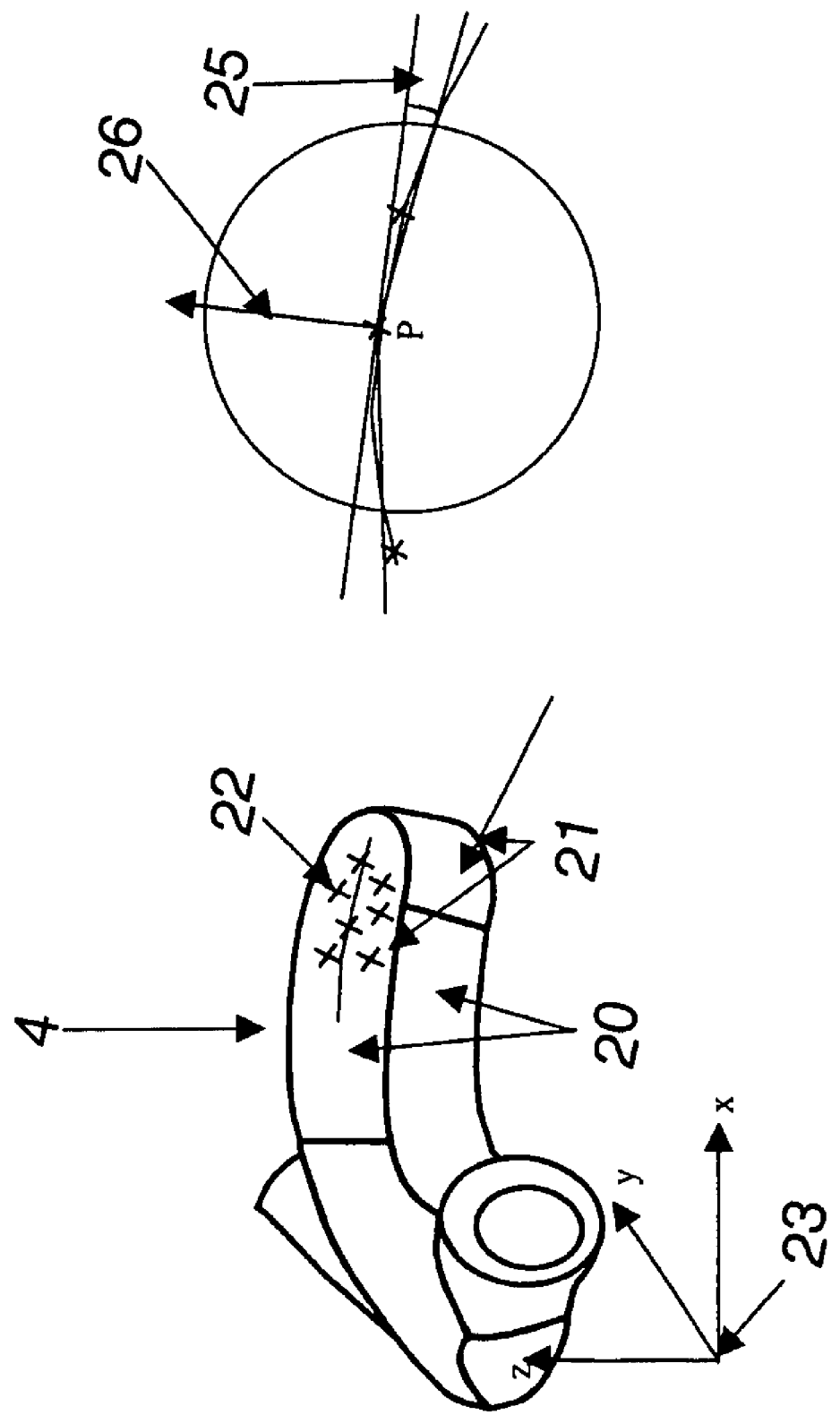
FIG. 3 shows an example of definitions for object classification and measuring point classification.

FIG. 3 shows some definitions for object classification. The object 4 has a plurality of object surfaces 20, and a plurality of edge lines 21. On the object surface there are a plurality of measuring points 22 indicated with cross. In the figure an object coordinate system 23 is shown. The object coordinate system is connected to the object, and all points on the object are related to the object coordinate system.

Possible classification measures for object surfaces are:

Average, maximum and minimum normal directions relative to other object surfaces.

Average, maximum and minimum bending angles in different directions relative to other object surfaces.

The position of the center of gravity of the object surface and the area of the object surface relative to other object surfaces.

Lengths of calculated edge lines which are connected to the object surface.

Possible classification measures of objects are:

The classification measures for the included object surfaces.

The classification measures for edge lines.

Spectrum of classification measures for measuring points.

In FIG. 3 an example of a bending measure in the form of a convex bending angle 25, and a normal vector 26 of a measuring point P are shown.

Possible classification measures for measuring points in one plane are:

Normal direction relative to other measuring points. To determine the normal direction, at least two assisting measuring points are needed.

A bending angle in at least one direction. To determine the bending angle, at least one distance measuring point is needed.

Coefficients in a "spline" through the point. To determine those coefficients at least two assistance points are needed.

Distance to other measuring points, for example to extreme points.

Possible classification measures for edge lines, which are calculated by the intersection between identified plans, are:

The tangential direction relative to other edge line points. To determine the direction of the tangent, at least one assistance measuring point is needed.

Bending angle along the edge line. To determine the bending angle, at least one assistance point is needed on the edge line.

Coefficients in a "spline" through neighboring edge line points. To determine those coefficients at least two assistant points are needed.

Distance to other edge line points, for example to extreme points.

Tables over characteristic parameters for surface points, surfaces and edge lines of the current CAD models are automatically generated in the classification module using data from the CAD-module. Using those parameters this module classifies the measuring points read by the robot when the measuring tip is in contact with the surfaces of the real object. Thus, the measured points will be marked with the objects, surfaces and edge lines to which they belong. When the classification is certain, those data is handed over to the calibration module.

Figure 4:
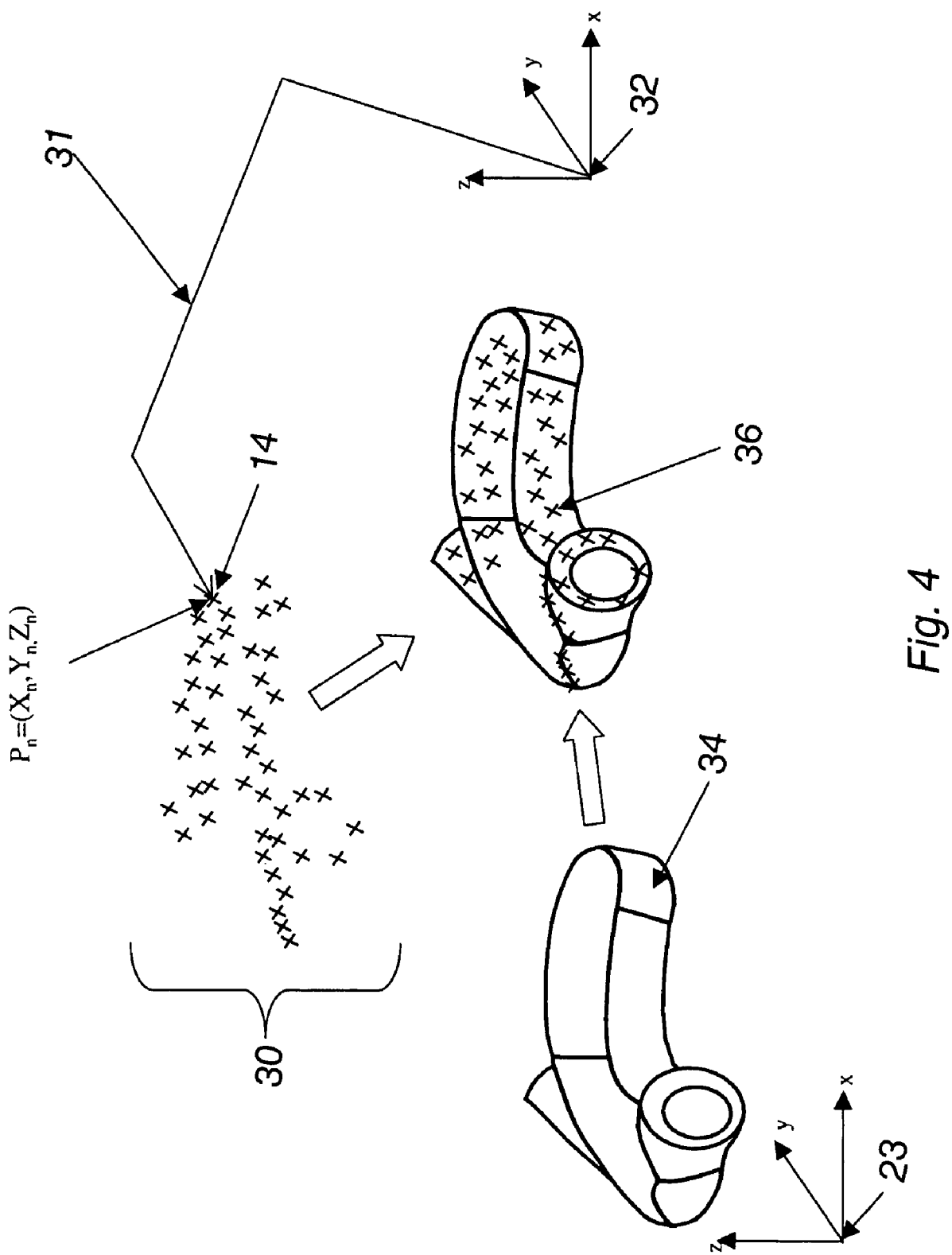
FIG. 4 illustrates the function of the classification module.

FIG. 4 shows the function of the classification module 16 in more detail. In the figure a plurality of measuring points 30 are shown, each measuring point is denoted with an x in the figure, which correspond to positions on the real object. The measuring points $P_n$ are measured by the robot kinematic 31. The control system of the robot calculates the positions of the measuring points in the base coordinate system 32 of the robot. The calculation is done by means of a kinematic model for the robot. In the CAD-module an object coordinate system 23 is defined, and a CAD model 34 of the object, described in the object coordinate system. The measuring points are classified, which means that it has been determined to which object the measuring points belong, and to which object surface or edge line the measuring points belong. Thus, for each measuring point it is decided to which object surface or edge line the measuring point belongs. A table is provided for each object surface, in which table the included measuring points are listed. This means that the measuring points 36 are positioned on the surfaces of the CAD model. This positioning can be considerably simplified, if the demand on the system to be able to recognize the object, is not so important, but instead the systems knows which is the current object, and the system shows the operator which surfaces or edges he should measure with the robot on a viewing screen. For example, the operator may provide the system with information about which object to be calibrated.

It is possible to read more details about how to perform the classification and recognition of objects in the document "CAD-based object recognition for a sensor/actor measurement robot" by Claus Brenner, Jan Böhm and Jens Güring. This document was displayed on the Internet, 11 Feb. 2003 and was found on the following address:

ifp.uni-stuttgart.de/publications/1998/CAD.pdf.

There is more to read about classification in the document "Automated extraction of features from CAD models for 3D object recognition" by Jan Böhm, Claus Brenner, Jens Güring and Dieter Fritsch, (ISPRS, Vol XXXIII, Amsterdam 2000) which was found on the Internet 11 Feb. 2003 on the following address:

ifp.uni-stuttgart.de/publications/2000/Boehm_Amsterdam.pdf

In the calibration module 17 a best possible adaption of the measuring points to corresponding points in the CAD model is carried out. For example the distance between the measuring points and the points on the surface of the CAD model could, for each object surface, be minimized by least mean square through translation in three degrees of freedom and rotation in three degrees of freedom. A corresponding method could be used for edge lines, and at last the distance between all measured points on the object and corresponding points on the CAD object can be minimized for the whole object, or at least for all surfaces and edge lines that have been measured. By means of this adaption, the position and orientation of the object that best fits the points measured by the robot is obtained. It is assumed that the TCP of the measuring tip is known, as well as the nominal kinematic of the robot. Thus, what the calibration module does is to place, i.e. locate and orientate, the object coordinate system 23 of the object relative to the base coordinate system 32 of the robot, in such a way that the best possible matching is obtained between measured points on the object and theoretical points on the CAD model.

In an alternative embodiment, the least means square adaption can be replaced with other optimization algorithms, for example Gauss-Newton.

Figure 5:
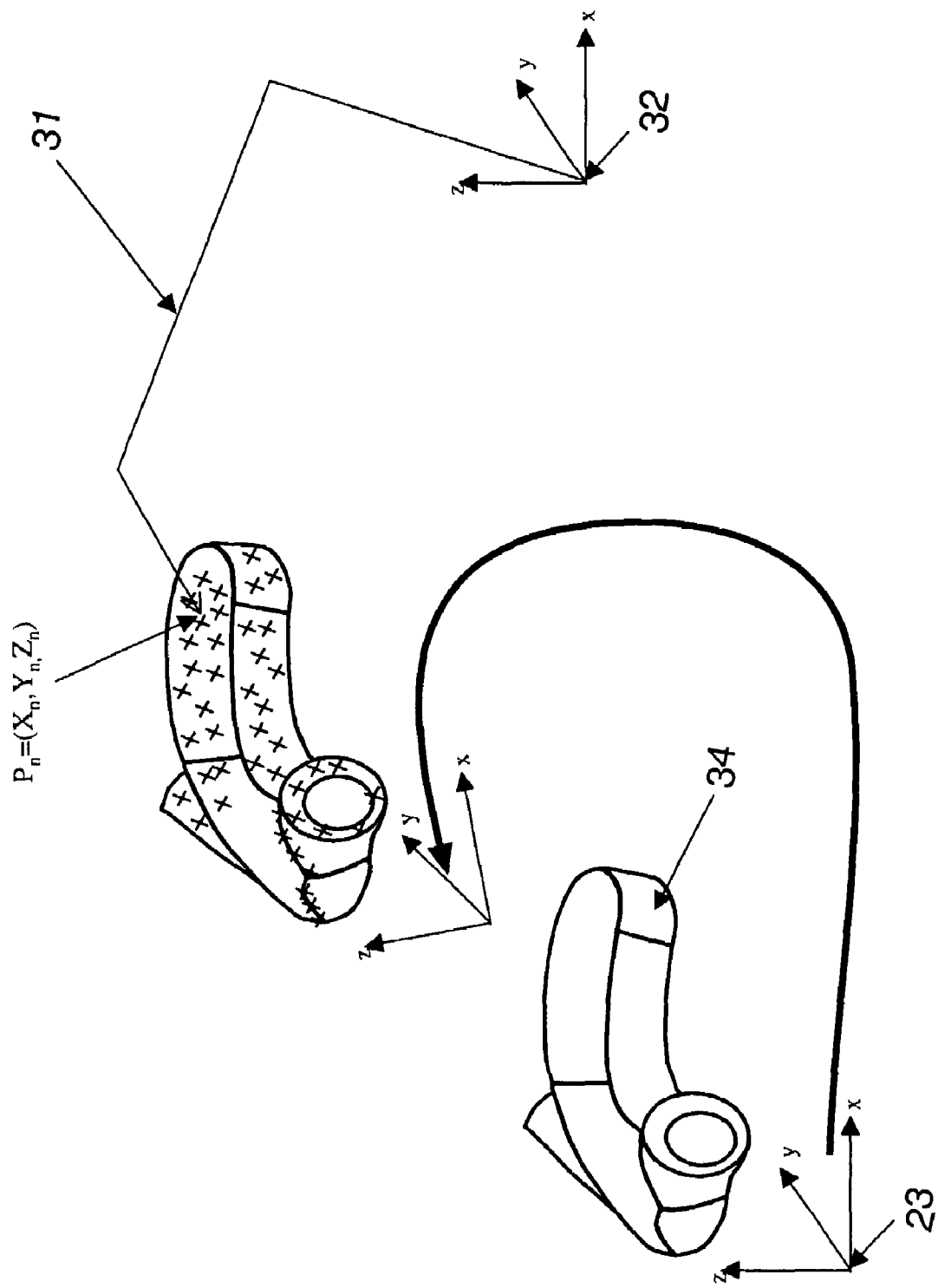
FIG. 5 illustrates the function of the calibration module.

The function of the calibration module is shown FIG. 5. The object coordinate system 23 is located and oriented relative to the base coordinate system 32 of the robot to obtain the best possible adaption between measuring points and corresponding classification surfaces, or edge lines, of the CAD model. In a first step, the classified measuring points for each object surface can be positioned for performing of a least means square matching of, for example normal vector direction, bending of the path, and position relative to the CAD model. Thereafter, the measuring points are matched for two object surfaces, three object surfaces and so on, at the same time relative to the CAD model, until least means square adaptations are obtained for all classified measuring points to the CAD model. This method can be replaced with, or supplemented with, a calculation of the edge lines between the plane, for which matching of measuring points has been done, and later the measured edge lines is least means square adapted with the edge lines in the CAD model.

The calibration module 17 optimizes the location of the current object, but does not do anything about the remaining deviations between measuring points and surfaces or edge lines of the CAD model. Those deviations are stored in the calculating module 18, to be used later for compensating the robot kinematic in the adjusting module 19. In the calculating module 18, the object surfaces are divided into subsurfaces, and the edge lines are divided into line segments. Each subsurface and each line segment should at least contain one measuring point for calculation of a representative error vector. A suitably direction of the error vector is perpendicular to the subsurface, or the line segment, as defined by the CAD model. Error vectors for a measuring point is a vector that reaches from the point of the surface of the model, corresponding to the measuring point, to the measuring point itself. An error vector has both length and direction.

A correction vector is calculated for each subsurface. For example, the average value of the error vectors for the measuring points belonging to the subsurface could be used as a correction vector. The length of the correction vector is determined as the average value of the length of the error vectors, and the direction of the correction vector is determined as the average value of the direction of the error vectors. In the case when compensation is made for edge lines, the direction of the correction vector is naturally given by the average direction of the error vectors for the current line segment. It is also suitable to use the same error vector direction for neighboring subsurfaces of the object surfaces, to which the edge line border.

In applications where accuracy parallel to the object surface is important, the error vectors may also contain lateral components. Those components are calculated for example from the normal error vectors of neighboring object surfaces, which normal directions form an angle to the normal direction of the current surface.

Figure 6:
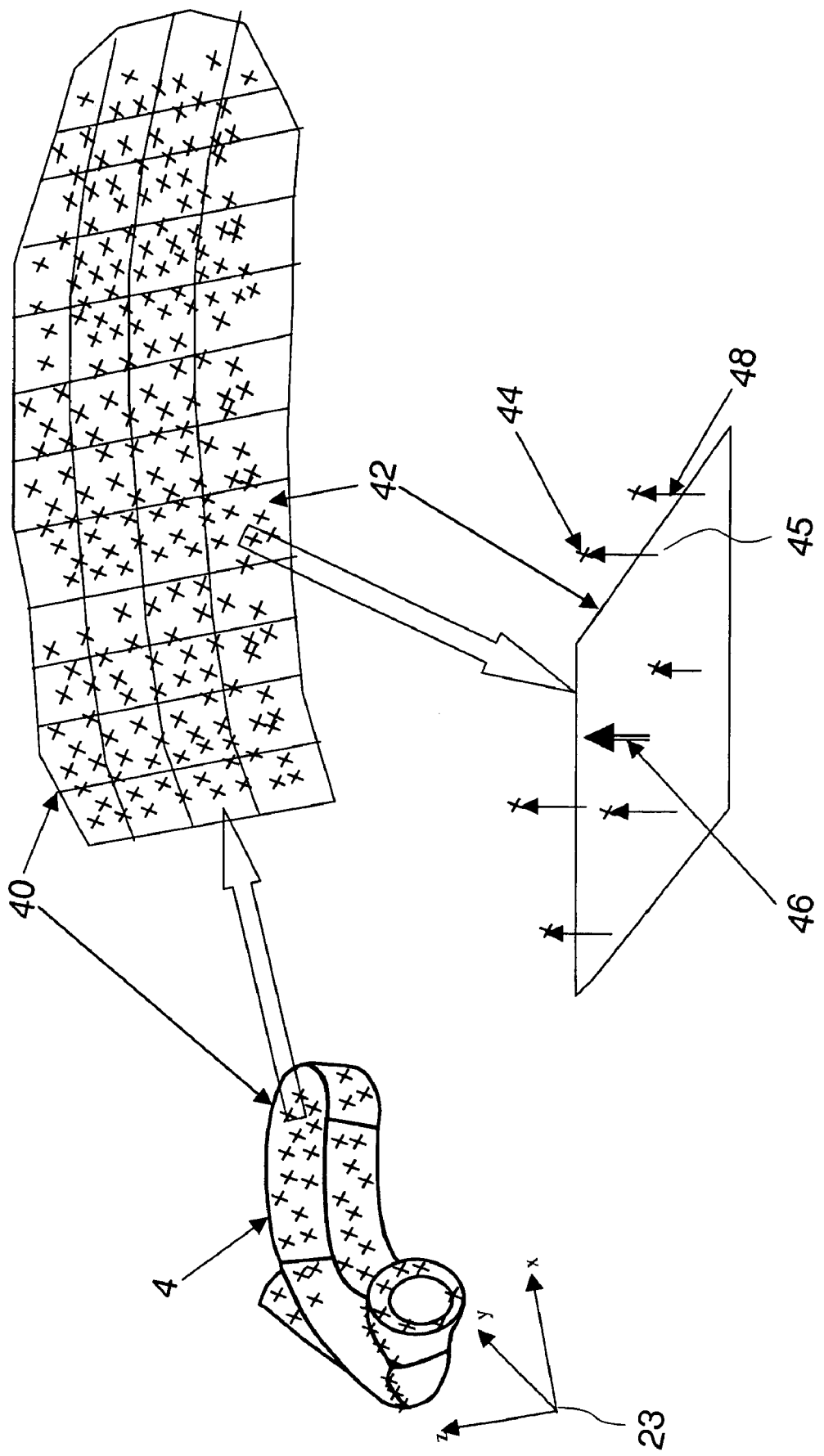
FIGS. 6-10 show the function of the adjusting module.

In FIG. 6 an object surface 40 of the object 4 is shown, which is divided into a number of subsurfaces 42. The measuring points are denoted with a cross in the drawing. A subsurface 42 is the surface defined by the CAD model. The measuring points are positioned, dependent of the remaining measuring point error, at a distance from the CAD subsurface 42. The remaining measuring point error depends for example on kinematic error, transmission error, gravity induced bending, changes in the robot geometry due to changes in the temperature, and errors in the TCP. In the figure, a plurality of measure point positions 44, relative to the CAD model, after the object calibration according to FIG. 5 are shown. A number of error vectors 48 are obtained, which lengths and directions are decided by the distance and direction between the measuring points 44 and corresponding points 45 on the surface of the CAD model. A correction vector 46 is calculated for each subsurface. The correction vector is calculated as the average error for the subsurface, i.e. the average value of the error vectors 48 is calculated.

An alternative to the using of subsurfaces is compensation with the closest error vector for closest measuring point, or by using the average value of the error vectors of the n number of closest measuring points.

A robot path is defined by defining a plurality of positions, which the robot is to run through along the path. Those defined positions are input data to the robot programming. When the positions are defined, the robot program can be automatically generated. Those positions can for example be defined in the CAD-module 15, by means of the CAD model of the object. Before a path, defined in the CAD-module, can be transferred to the robot control system, the positions of the path have to be adjusted in dependence of the remaining measuring point errors. The defined path positions are compensated by using the error vectors stored for the subsurfaces or line segments, through which the path run through. To achieve a smooth compensation along the path, a smoothing is carried out, by means of filtering the length of the error vectors in the transitions between the subsurfaces or line segments.

Figure 7:
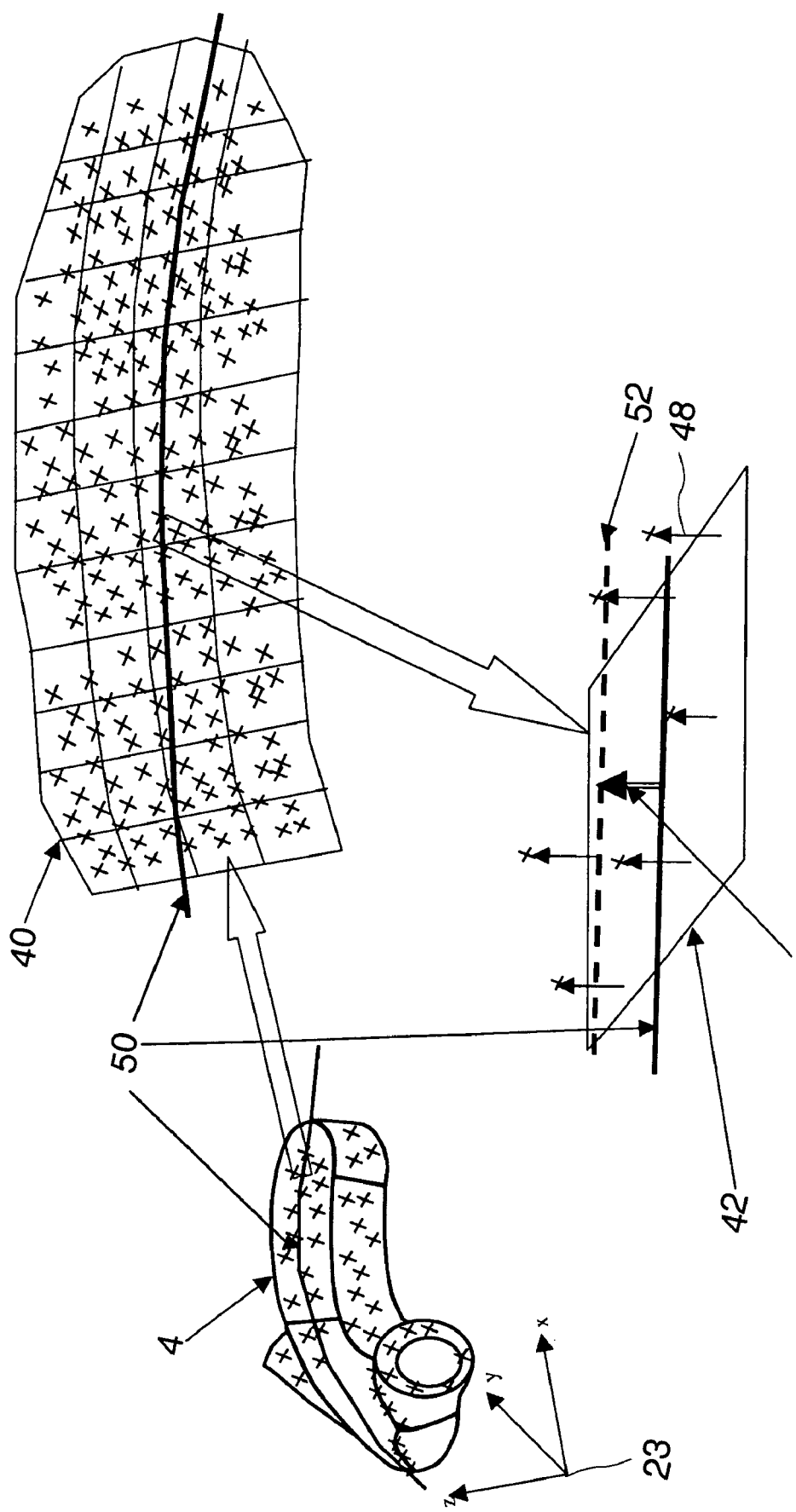

FIG. 7 shows how a robot path 50, defined in the CAD model, is adjusted by using the stored correction vectors 46, which are the average error of the error vectors 48 in the subsurface 42. The robot path 50 is compensated by adjusting it in the normal direction of the surface, a distance that corresponds to the size of the correction vector 46 for the subsurface. By adjusting the robot path for each subsurface, a new adjusted robot path 52 is produced. When the adjusted robot path 52 is used as a reference to the robot, the TCP of the tool will follow the surface of the real object, as pointed out by the path program in the CAD model.

Figure 8:
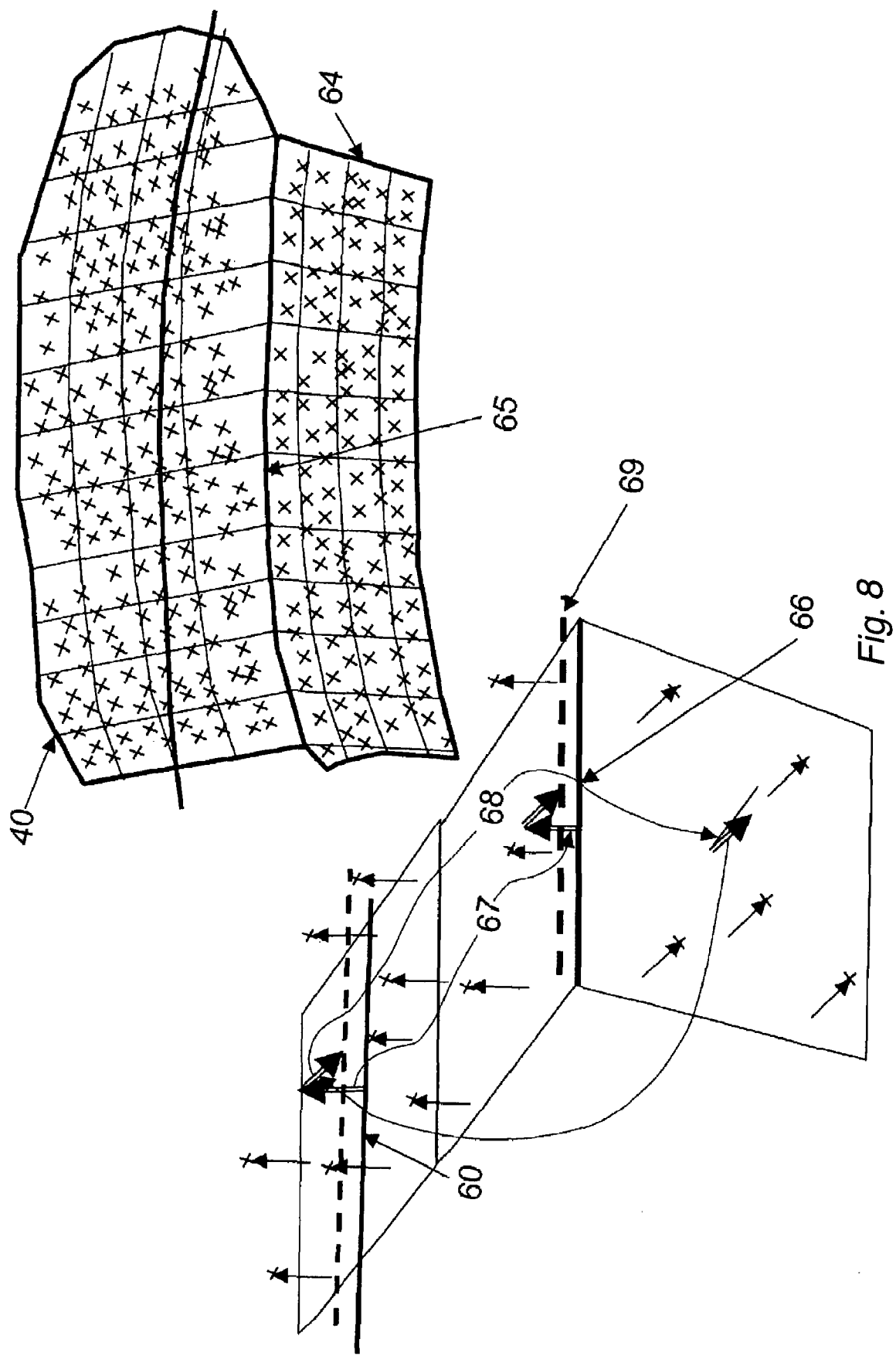

FIG. 8 shows the compensation of a robot path 60, programmed in the CAD model, where the path is compensated for errors in two directions. In the figure, a first object surface 40 is shown, and a second object surface 64, neighboring to the first object surface. An edge line 65 divides the object surface 40 and the object surface 64. The edge line 65 is the intersection between the object surfaces 40 and 64. In the CAD model there is an edge line 66 corresponding to the edge line 65. The edge line 66 in the CAD model is adjusted to be in accordance with a corresponding edge line on the object. The adjusting of the edge line 66 is based on the correction vectors 67 and 68 of neighboring subsurfaces in the object surfaces 40 and 64. The edge line adjusted in such a way is denoted 69 in the figure. The path 60, programmed in the CAD model, is compensated in dependence of the average error in the normal direction of the subsurface of the objective surface 40, i.e. the correction vector 67, and the average error in the plane of the subsurface given by the average error of the closest subsurface of the object surface 64, projected on the subsurface in the object surface 40, i.e. the correction vector 68. In that way the path will be compensated for errors in two directions.

Figure 9:
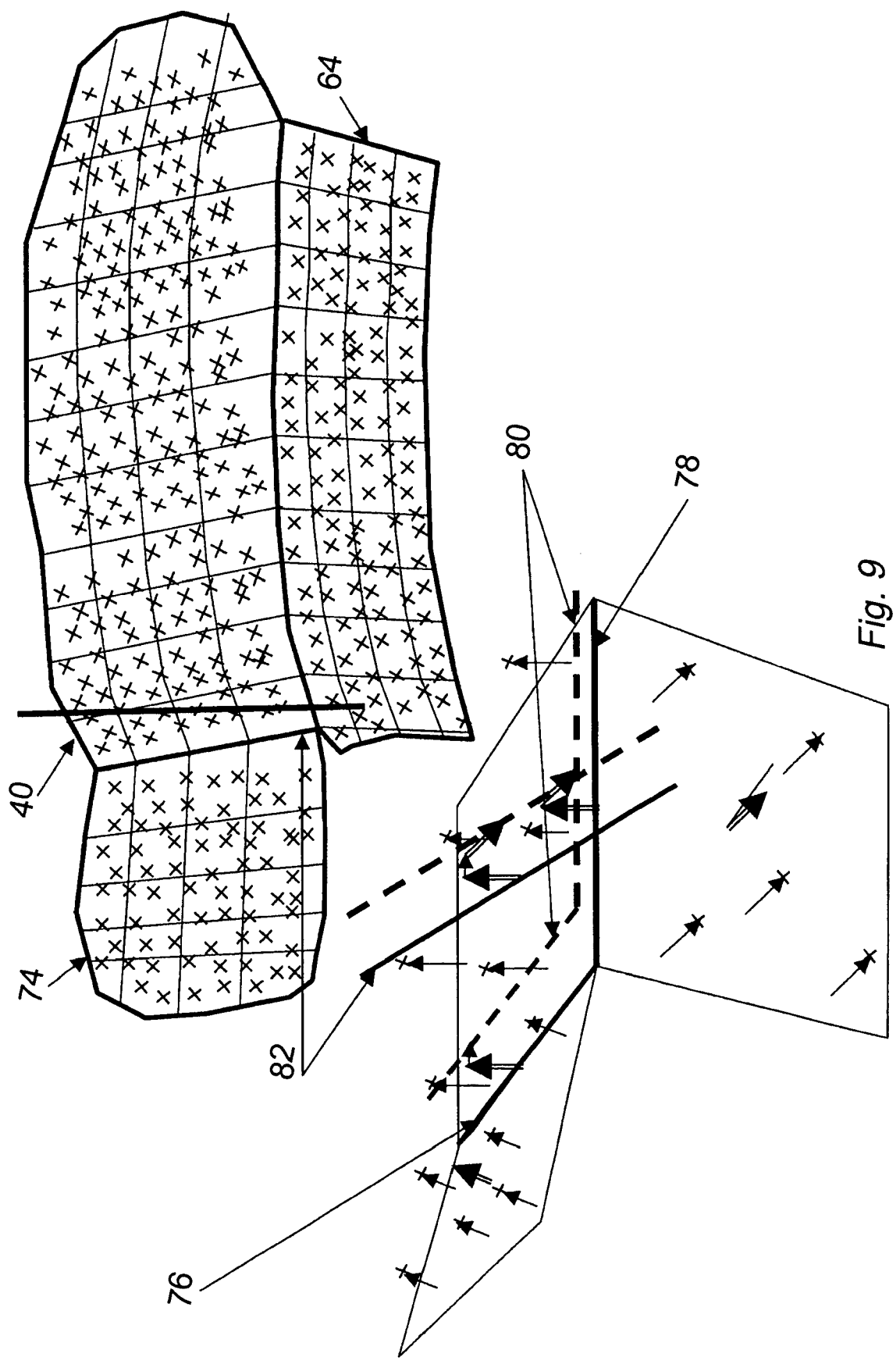

FIG. 9 shows how a robot path 82, programmed in the CAD model, is compensated for errors in three directions. An edge line 76 is calculated as the intersection between the object surface 40 and an object surface 74. An edge line 78 is calculated as the intersection between the object surface 40 and the object surface 64. Adjusted edge lines 80 are calculated in dependence of the correction vectors of neighboring subsurfaces in the object surfaces 40, 64 and 74. In the figure, the compensated path 84 is shown, which is compensated for errors in three directions. The correction vectors can either be obtained from neighboring object surfaces, or neighboring edge lines.

Figure 10:
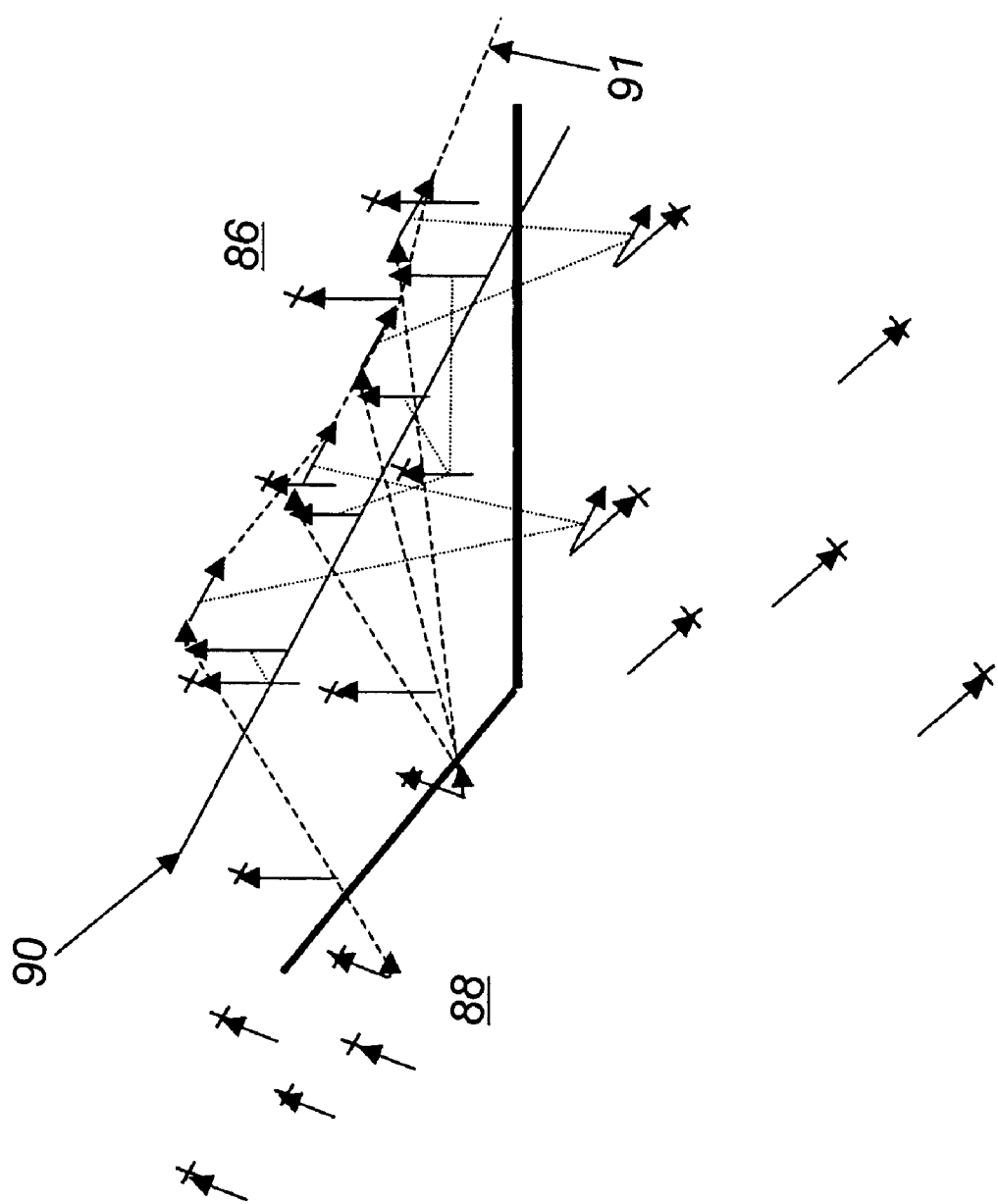

FIG. 10 shows an alternative embodiment, wherein the compensation is done by means of the closest error vector in the closest object plan. This can be extended with the average value of the n closest error vectors in respective object plan. In the figure, 86 denote a first object plan, and 88 denote a second object plan. Path 90 is programmed in the CAD model and path 91 is the compensated path. As shown from the figure, the compensated path becomes irregular with sharp transitions between different segments of the path. To reduce the noise of the compensated path and to obtain a smoother path, the positions of the path can be filtered with respect to the path length.

When a path, generated by lead through of the robot, is about to be stored in the CAD model, for example to later be stored in other robots, a reversed compensation is done by using the stored error vectors.

In the following an embodiment of a method for programming an industrial robot according to the invention is described. The object to be machined is fixedly positioned in its fixture. Alternatively, if the tool is fixed in the room, the object to be machined is fixedly mounted to the grip device of the robot. The measuring tip is mounted on the tool, or to the tool holder of the robot. If the tool is not fixed in the room, the tool is fixedly mounted to the tool holder of the robot. The measuring tip is moved forward and backward over the surfaces of the object, and meanwhile the robot follows the movements. In an alternative embodiment, the operator inputs information about which object to be used during calibration, and the system shows later, during the measuring with the robot, via a monitor, which surfaces to be scanned by the measuring tip.

The control system of the robot calculates the positions of the points in any coordinate system of the robot. The measuring points are transferred to the classification module, which classifies the measuring points. The classified measuring points are transferred to the calibration module, which calculates error vectors in dependence of deviations between the measuring points and corresponding points on the CAD model. The calculating module also calculates the path correction vectors for subsurfaces of the object. The system can also, during measuring, do classification, calibration and calculation of path correction vectors, and determine, as new object surfaces are measured, when there are enough measuring points. A criterion showing that there are enough measuring points, is for example that the standard deviation, during adaption of the measuring points to the geometrical model, is less than a determined value. When the criterion is fulfilled, the system informs the operator of the fact that the measuring is done.

When a sufficient number of measuring points have been fed to it, the system calculates the position and orientation of the object coordinate system, relative to the base coordinate system of the robot, and the correction vectors for the subsurfaces and line segments being generated. The correction vectors, and the position and orientation of the object coordinate system relative to the base coordinate system of the robot, is transferred to the adjusting module, which adjusts the positions defined for the robot movement. The robot program is automatically generated based on the adjusted positions.

In the following, running of a program generated in a CAD-module is described. The operator mounts the process tool, for example a polishing wheel. The robot path, defined on the object surfaces of the CAD model for TCP, is compensated with the correction vectors effective for the subsurfaces, through which the robot path passes. The corrected positions, and the object coordinate system calculated by the calibration module, is used for calculating the robot path in the robot base coordinate system. By means of the kinematic model, which is also used during the calibration, the shaft angles of the robot is calculated for the interpolated robot path and is used as a reference to the robot servo.

In the following, programming of a robot path by lead through is described. The operator mounts the tool to be used. The operator moves the tool along the object to simulate the work to be performed by the robot. The system reads the positions of the robot axes, and calculates, by means of the robot kinematic that has been used during the calibration and the object coordinate system calculated during the calibration, the robot paths generated by the operator in the object coordinate system. The system adjusts the paths by means of the correction vectors that have been generated during the calibration of the subsurfaces. Thereby, the paths will be positioned on the object surfaces of the CAD model, and can later be used for running robot paths generated from CAD, for example in an other robot installation.

Figure 11:
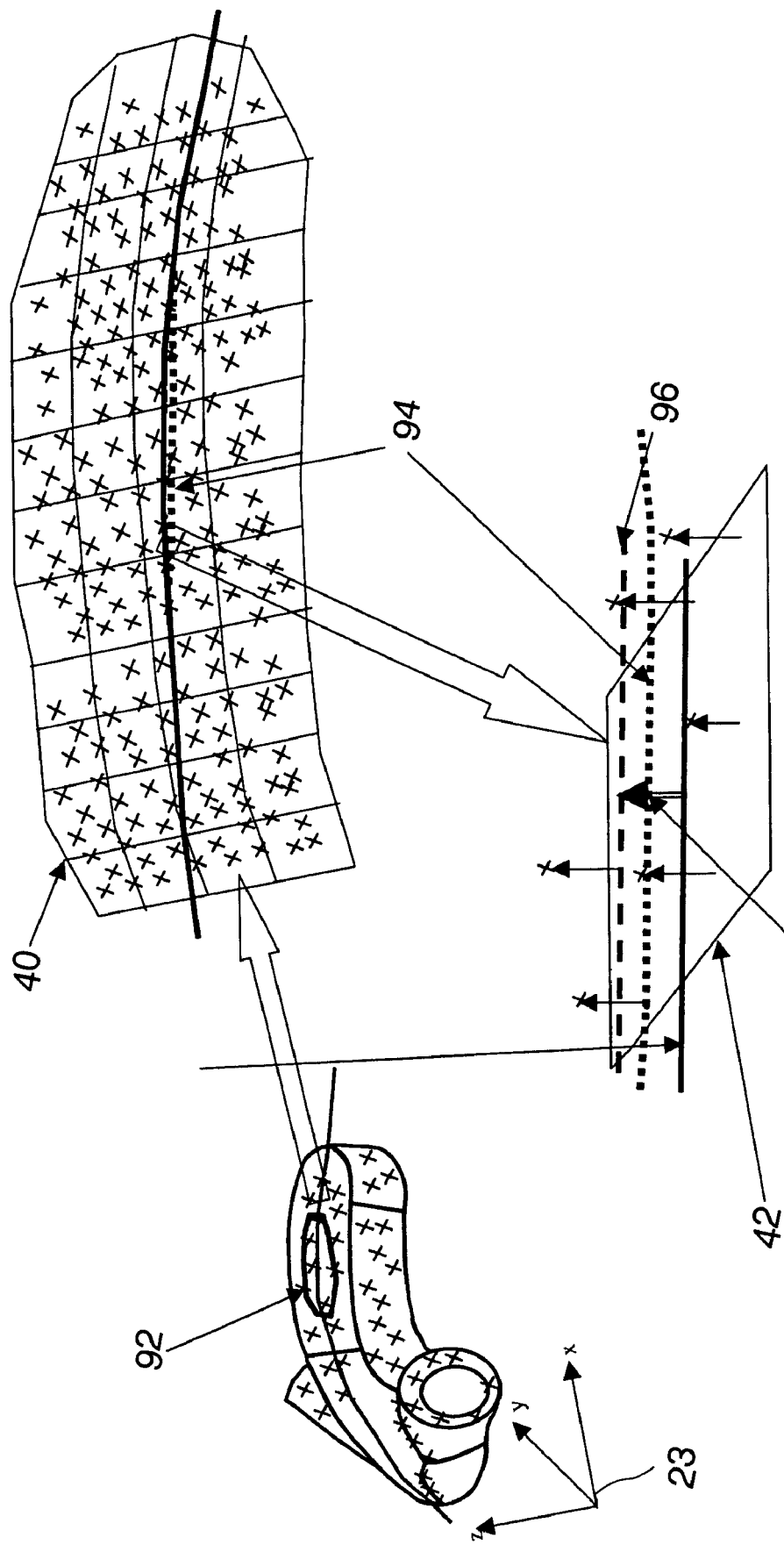
FIG. 11 shows an example of program editing.

FIG. 11 shows the program editing. The operator points with the measuring tip, or the tool, on an area 92 of the object surface, where the process has not achieved a good enough result, and informs the system about what is not good, for example by speech communication. The operator specifies how the path should be modified, for example "increase processor power" or, as shown in the figure, "reduce the distance to the object". The system collects data from the CAD model for the subsurfaces, or line segments being marked by the operator, and adjusts the robot path for those subsurfaces, for example moves the path closer to the object surface, when the depth of the polishing shall be increased in the marked area. The robot path 94 is moved in the direction of the surface normal in that part of the path that is positioned within the area 92 marked by the operator. To avoid that the modification becomes too abrupt, the new path is calculated with a soft transition into and out of the area 92 marked by the operator. The adjusting of the path 96 is stored in the model of the CAD system.

Figure 12:
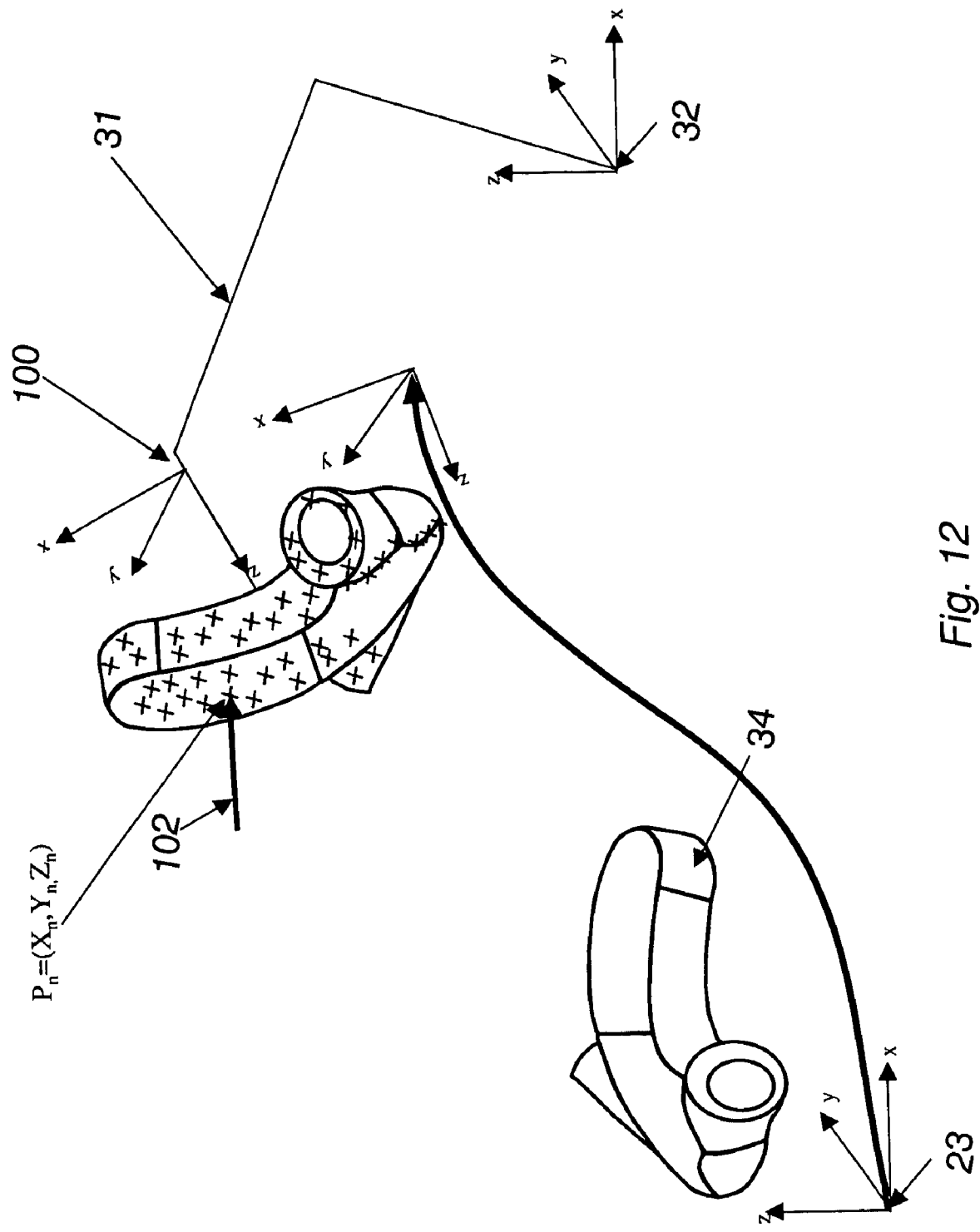
FIG. 12 shows an embodiment having a TCP fix in the room.

FIG. 12 shows measuring with a TCP fixed in the room. When a tool having a TCP fixed in the room is used, it is no longer suitable to use the robot base coordinate system 32 to define the measuring points. Instead, the wrist coordinate system 100 of the robot is used. A measuring tip 102 fixed in the room is used during the measuring. The measuring points $P_n$ ($X_n, Y_n, Z_n$) are expressed in the wrist coordinate system 100. The object coordinate system 23, which is defined in the CAD-module, is positioned and rotated relative to the wrist coordinate system 100, to obtain the best possible adaption to the measuring points.

Figure 13:
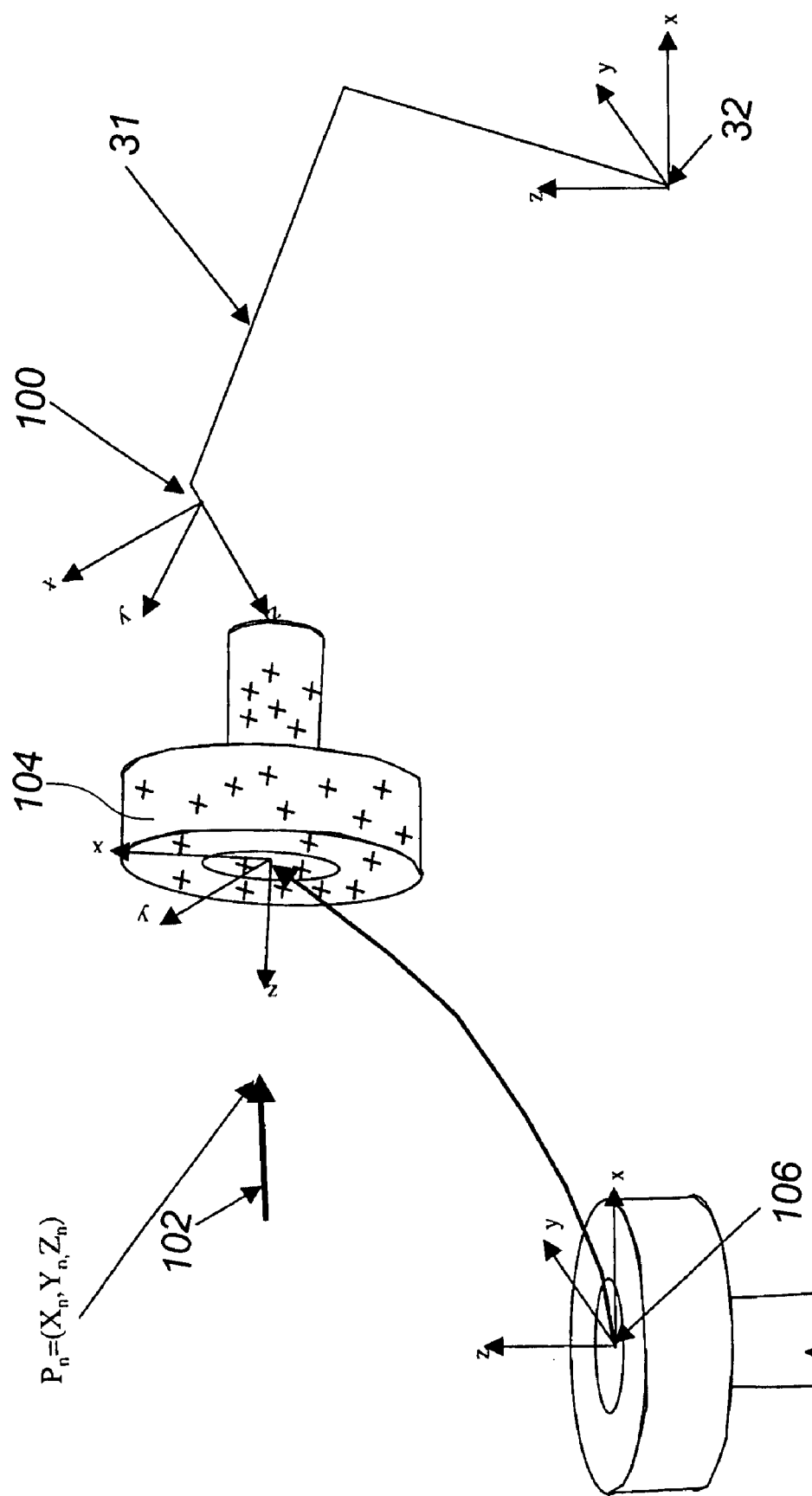
FIG. 13 shows calibration of the tool.

FIG. 13 shows calibration of a tool 104 by means of a measuring tip 102 fixed in the room. The tool is mounted on the tool holder of the robot. A CAD model 105 for the tool is stored In the CAD-module. The CAD model of the tool is defined in a tool coordinate system 106. The orientation and position on the CAD model relative to the wrist coordinate system 100 is determined by adapting the CAD model 105 and the measuring points, marked with an x in the figure, in the best possible way to each other. The tool coordinate system 106, which is defined in the CAD-module, is positioned and rotated relative to the wrist coordinate system 100 to achieve the best possible adaption to the measuring points. When a TCP fixed in the room is used, the measuring tip is mounted on the wrist of the robot, and the measuring is performed as shown in FIG. 4. The same method can also be used for gripping devices and fixtures, if those exist as CAD models.

Figure 14:
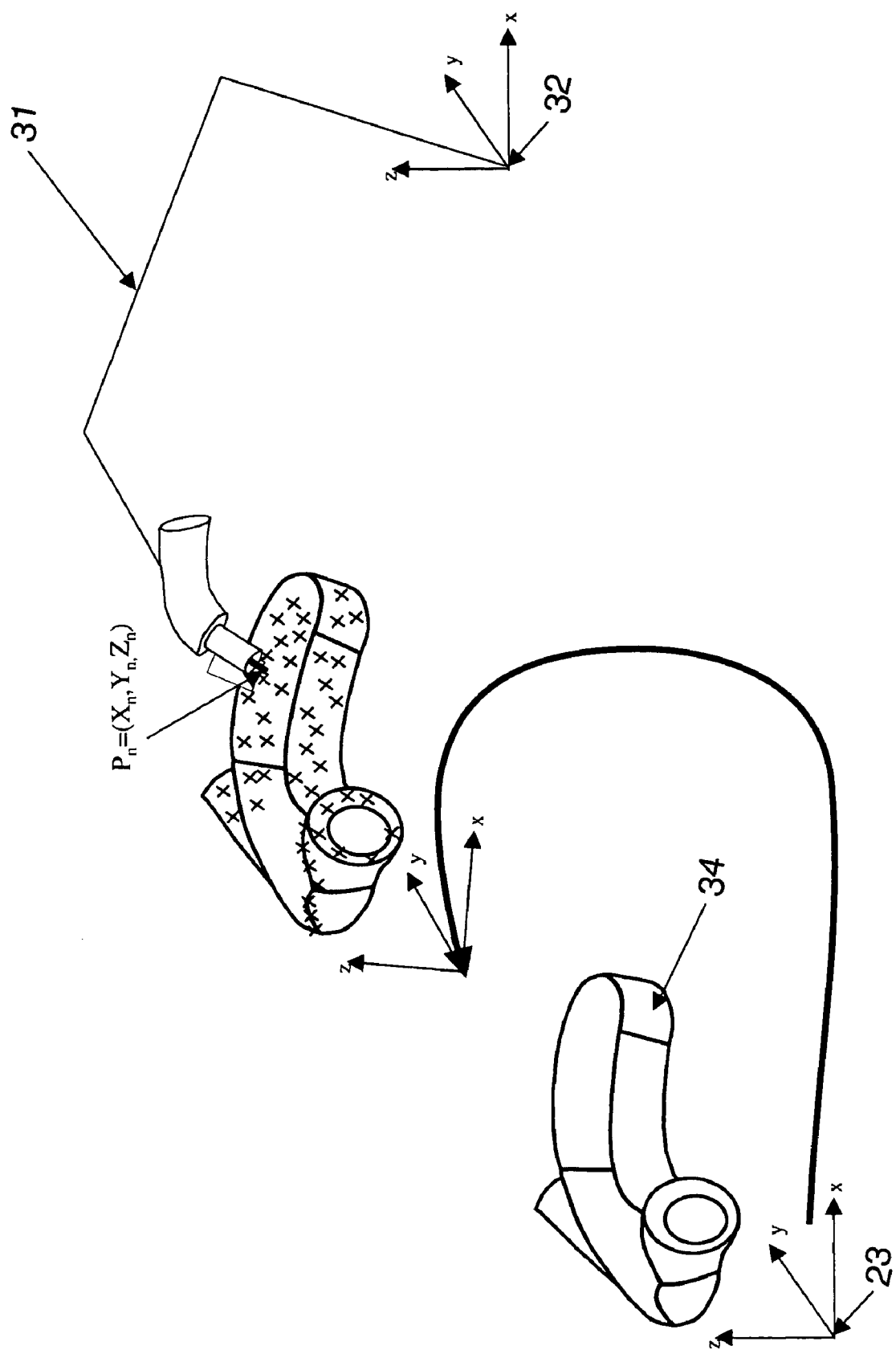
FIG. 14 shows an example adapted for an arc welding application.

In FIG. 14 it is shown how the invention can be applied for arc welding. In an arc welding application the tools can by itself work as a measuring tip. However, if the welding wire is too weak for the programming, a measuring tip can be mounted directly on the welding pistol by means of a protruding part, corresponding to the length of the welding wire. If no CAD model exists, the system can still, by means of the measuring points, divide the object into plans, and calculate the intersection lines between the plans, and locate the robot path in the intersection lines, which facilitates for the operator.

It is also possible to generate a CAD model by means of the robot. The operator uses the robot for measuring one plane at a time, and he informs the system when he is about to measure the next plane. Alternatively, the system can have the necessary intelligence to decide how the measuring points shall be divided in a plane by the previously described classification method. The system does a least mean square adaption of a plane, for example using "splines" to the measuring points being fed. The planes adapted to the measuring points, and the intersection lines of the planes are described in CAD model format, and is put into a CAD data base for use according to the previous description of calibrating etc. Perhaps, the model generation can be done by iterations, wherein during a first iteration only a few measuring points are read, to obtain a rough CAD model, and thereafter the previously used methods are used.

When there are kinematic errors of the robot, the measuring position, measured by the robot, will be dependant on the tool orientation. To minimize this error, when the operator measures the object surfaces, he should use the tool orientation that will be used later when the robot shall execute paths on this surface. One way to force the operator to keep the correct orientation during the measuring, is to let the operator first feed the measuring points without any high accuracy of the robot orientation, and that the system later makes the adaption of the obtained measuring points, and then the operator redoes the measuring once again, but this time the system locks the tool orientation to the orientation which counts for the robot paths in respective object surface. This locking is made by force control of the robot; wherein the three degrees of freedom of the orientation are made stiff, while the three degrees of freedom for the positions are made soft.

The kinematic of the robot is changed due to the temperature, fixtures wears, and robot components have to be changed. To avoid redoing the manual providing of measuring points for new coordinate system adaption, and path compensation, the measuring program, once made by the operator, can be stored in the system and then automatically be generated for a new measuring of object, tool, fixture etc. The robot is then run using force control, for example in admittance control mode.

To secure the contact between measuring tip and object, the measuring tip may comprise a sensor (LVDT, force sensor, pressure sensor, optical sensor, eddy current sensor etc.). In the case of an electrically conducting object and tool, an electric circuit (preferably alternating) could also be connected between measuring tip and object.

To make it easier for the operator during the measuring of the points on the object, speech communication can be used instead of having set of buttons and a monitor.

While the measuring points are fed, the system may perform classification and best fit calculations, to inform the operator about how many measuring points that are needed to have enough accuracy in calibration and path compensation.

It should be noted that the method trusts the repeat accuracy of the robot, and it does not need an expensive and accurate robot, or a robot having a complicated software compensation of the kinematic parameter errors.

An alternative to manually capturing measuring points, is to generate a surface scanning program in the CAD system, which surface scanning program controls the movement of the robot during measuring of the measuring points. The positions of the measuring points are decided in the CAD system based on geometric model of the object, and input from the operator. Thus, during the robot programming in the CAD system, it is not only the position and orientation of the process path that is programmed, but also a surface scanning program to provide measuring points on the surface of the object, which measuring points later is used as a basis for the calibration of the robot and the CAD model.

In one embodiment, the user shows where to place all the measuring points on the object, and the path to be followed by the robot during the measuring, by pointing on the CAD model of the object. Thereafter, a surface scanning program is automatically generated, which surface scanning program controls the movements of the robot during the measuring. In another embodiment, the user only shows the measuring points and the robot motion, necessary for performing the measuring, are automatically generated. In a third embodiment, it is enough if the operator defines which surfaces to be measured, by pointing out those surfaces on the CAD model. Thereafter the CAD system generates a surface scanning program for controlling the movements of the robot during the measuring. Besides which surfaces to be measured, the user also specifies the scanning density of the measuring. The CAD system lays out the positions of the measuring points in a raster, and later determines by means of known surface normal directions, which movement paths to be followed by the robot during the measuring.

To minimize the influence of the kinematic error of the robot, it is advantageous to use the same tool orientation during the calibration as will later be used in the process program, i.e. the program which controls the process which the tool will carry out on the object. Thus, the orientation in a measuring point is advantageously chosen to be the same as the orientation of the closest work point on the robot path.

Figure 15B:
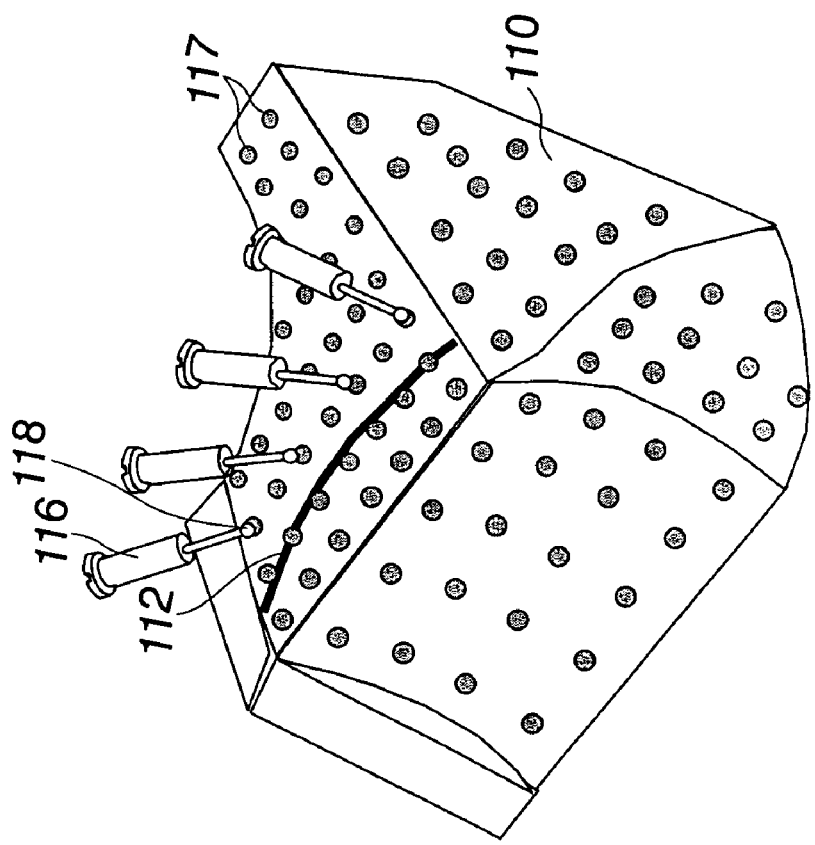
FIG. 15b shows a measuring device measuring a plurality of measuring points on the object.
Figure 15A:
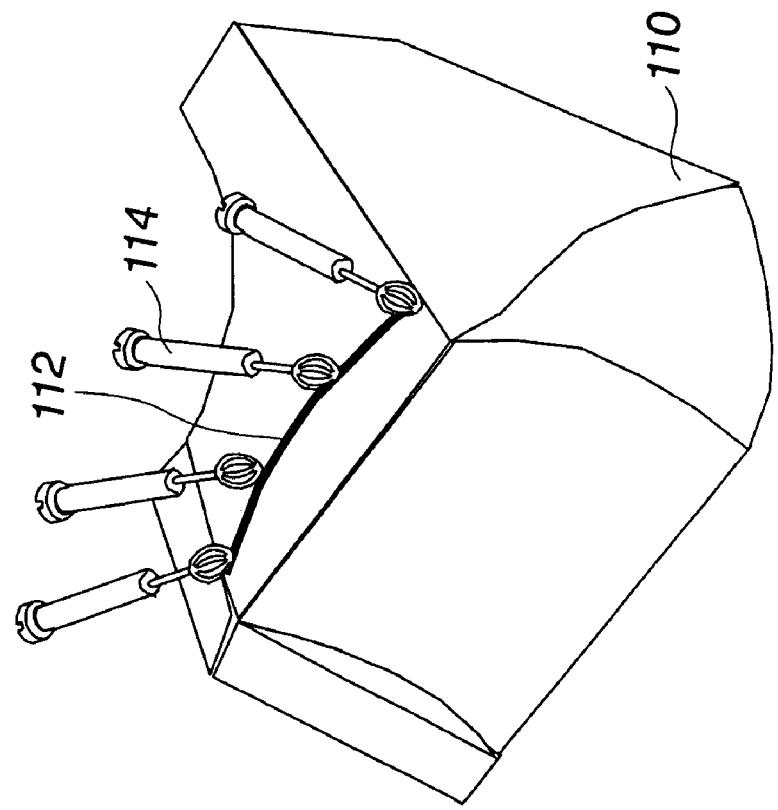
FIG. 15a shows a tool tracking a process path on an object.

FIG. 15a shows an object 110, and a process path 112 along which a tool 114 shall process the object. FIG. 15d shows the same object 110 having a number of measuring points 117 laid out by the surface scanning program. The measuring device 116 is used during the calibration for measuring the measuring points 117 on the surface of the object. The orientation of the measuring device 117 in the measuring points is determined by the orientation of the tool 117 in the closest work point on the path 112. To be able to determine the position of the measuring points relative to the coordinate system of the robot, the measuring device 116 comprises a sensor 118. In an alternative embodiment the current tool is used instead of the measuring device, which tool is provided with a sensor mounted directly on the tool. The sensor should have a TCP relative to the tool TCP that is known to the CAD system.

The sensor 118 can be of two different types, for example a sensor detecting when it is in contact with the surface of the object, and then generating a signal to the robot, which then generates a measuring point corresponding to the position of the robot. This function is called search stop. Examples of suitable sensors for search stop are a force sensor and a pressure sensor. At search stop, an electrical contact function may also be used. To make it possible to determine the positions of the measuring points on the surface of the object in the robot coordinate system, the distance between a part of the robot, preferably the tool holder of the robot, and the TCP of the positioning sensor has to be known.

A disadvantage with the use of search stop is that the measuring method will become slow, due to the fact that the robot has to keep a low velocity when it approaches the surface of the object. An alternative is instead to use a sensor measuring the distance between a part of the robot, preferably the tool holder of the robot, and the surface of the object. A suitable sensor is for example a LVDT sensor. During measuring with a LVDT sensor, contact between the surface of the object and the sensor is required during the measuring. It is also possible to use a sensor adapted for contactless measuring, for example sensors based on laser, ultra sonic, eddy current, induction, micro wave, air flow and capacitance measuring.

Figure 16:
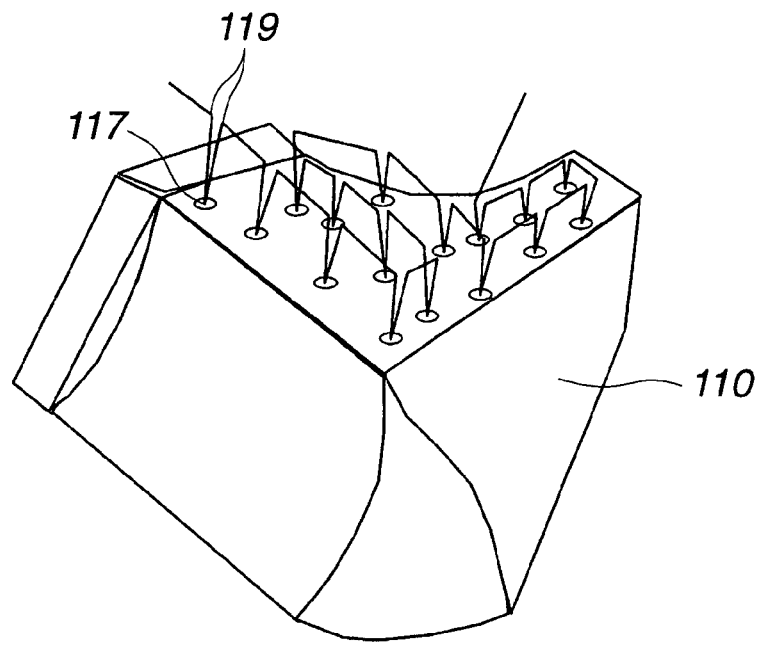
FIG. 16 shows an example of an automatically generated robot path for measuring points on the surface of the object by means of an LVDT sensor.
Figure 17:
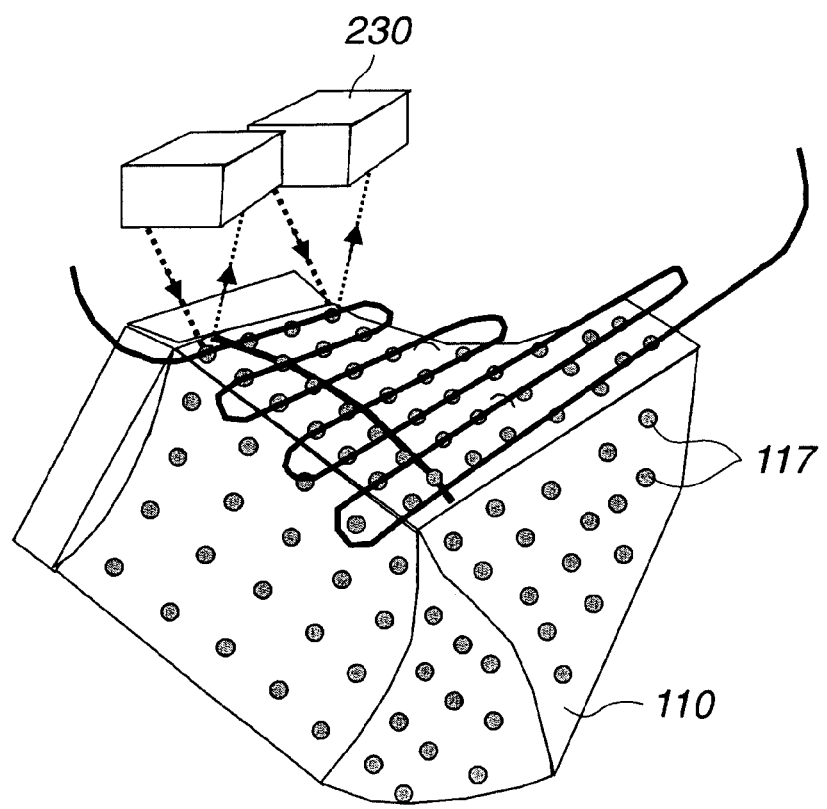
FIG. 17 shows an example of an automatically generated robot path for measuring points on the surface of the object, with sensor adapted for contactless measuring.

During the measuring, the positions of the measuring points are determined relative to the base coordinate system of the robot. The surface scanning program does not only generate the measuring points, but also generates the path to be followed by the robot between the measuring points. The shape of this path depends on which type of sensor is used. For example, if a LVDT sensor is used, or any other sensor wherein contact with the object surface is necessary for the measuring, a robot movement is generated, first moving the robot to a position located at a distance from the measuring point, a so called moving position, and thereafter moving the robot in a direction towards the surface of the object until it reaches the measuring position. Thereafter the robot is moved outward again in a direction away from the surface of the object to another moving position at a distance from the surface of the object. Such a robot path is shown in FIG. 16, wherein the moving points are denoted 119. If a sensor for contactless measuring is used instead, the programmed movement can be performed parallel to the surface of the object during the measuring. FIG. 17 shows an example of an automatically generated robot path for measuring points on the surface of the object with a sensor 230 for contactless measuring. The sensor 230 is a distance measuring laser probe of a triangulation type.

Due to the fact that the robot is not yet calibrated relative to the object when the measuring points are generated in the CAD system, there is an uncertainty about where the object is situated relative to the robot. If a sensor is used which requires contact with the surface of the object during the measuring, the surface scanning program has to consider the kinematic and geometric errors of the installation. For example, if the robot cell is calibrated with an accuracy of 5 millimeter, there has to be a collision free zone of at least 5 millimeter between the object and the TCP of the sensor in its rest position when the robot moves between the measuring positions. The measuring positions also has to be located at least 5 millimeter from the edges of the object, so that the robot will not fail to hit the object when it goes down towards the object surface to measure it. The measuring is made when the robot has moved the TCP of the sensor down towards the surface of the object. Thus, the surface scanning program has to be generated with enough margins.

Figure 18:
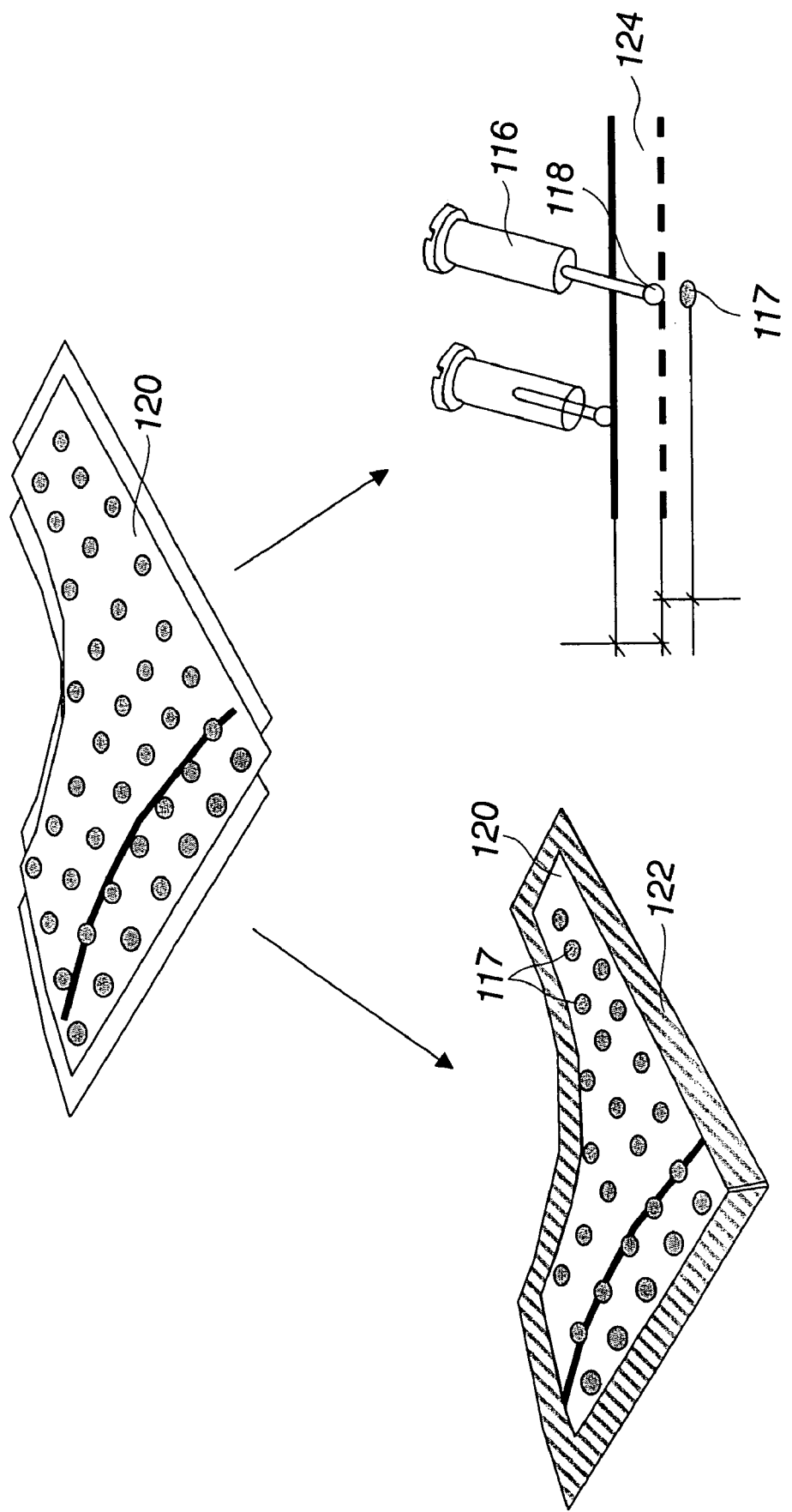
FIG. 18 shows automatic generation of measuring points, with regards to he uncertainty of the placement of the object relative to the sensor during the measuring.

In FIG. 18 the upper figure shows an object surface 120 having manually positioned measuring points, and the lower left figure shows measuring points 117 automatically generated by the surface scanning program. The figure illustrates that the automatically generated measuring points have to be kept within an uncertain zone 122. The zone 122 represents the area in which it is uncertain if the object is there or not. Within this zone no measuring points should be generated. If the sensor in any way should fail to hit the object when the measuring device is moved down towards the surface of the object, the program should include a function, which detects if the sensor has been moved too far, and which then interrupt the measuring of the measuring point. The left figure illustrates that it during measuring with an LVDT sensor also has to be margins during programming of the sensor movement in a direction towards a measuring point 117. The figure shows the uncertainty due to where the object surface actually is situated. The object surface is positioned somewhere in the zone 124 shown in the figure. To be certain that the sensor will not fail to hit the surface, the measuring point 117 should be placed at a distance corresponding to the accuracy, in the previous embodiment 5 millimeter, below the object surface in the CAD model.

During calibration of the robot cell, a simple calibration of the tool and the object coordinate system is done at first. Then the sensor is mounted on the tool, or the measuring device is mounted on the robot, and the sensor TCP which is generated by the CAD system is possibly controlled by any known method. Thereafter the surface scanning program is loaded from the CAD system and is run by the control system of the robot. The positions for the measuring points, measured by the robot, are stored. Thereafter the calibration is carried out by adapting the measured surfaces to the surfaces of the CAD model. When the measurings of the surface of the object is done, the sensor is taken away and the tool is made ready for process execution.

Then the process program from the CAD system can be loaded and run directly. The loaded program has been automatically adjusted by data from the surface scanning with regard to the object coordinate system and local correction vectors.

In case the accuracy in the robot cell is too bad, for example more than 20 millimeter, it may be necessary to adjust the CAD generated surface scanning program, or program a surface scanning program in the robot cell. In the first case, in which the surface scanning program is generated by the CAD program, the border of the object surface can be programmed by the operator for each object surface to be measured, whereupon the control system of the robot automatically adjust the existing program generated by the CAD. The border of the object surface is programmed by the operator who is manually jogging the robot to points located along the borders of the object surface.

An alternative to generating the surface scanning program in the CAD system, is to let the user himself generate a surface scanning program by using suitable programming means, for example in the control system of the robot. By jogging the robot to the object, the user shows where to start the program and the end position of the program. If necessary, the user may also show one or a plurality of positions on the object between the start and end position, for example to specify the bending and the direction of the measure movement. Based on the positions specified by the user, the positions a surface scanning program is automatically generated, which generates the necessary number of measuring points to cover up the surface.

The user jogs the robot to a start position, to one or more intermediate positions and to an end position on the object. During programming, the sensor is moved to a suitable measuring position, for example in the middle of the work area for a LVDT sensor. Input data to the surface scanning program generation is measuring range of the sensor, sensor type, control type, and desired density of measuring points, after which the surface scanning program is automatically generated. It is also possible to define a whole object surface, by specifying a plurality of points along the borders of the surface, wherein the scanning density is specified in two dimensions.

An alternative to automatically generating a surface scanning program that automatically scans the measuring values, is to automatically generate measuring movements during jogging of the robot. For example, this can be done in such a way that when jogging a defined increment has been done, the jogging is locked, and a measure movement is carried out in the defined direction. When the measure has been finished, the jogging will start again. The direction of the measure movement can be defined by a simple two points calibration. In this case, it may be suitable to use force control or soft servo to avoid erroneous jogging from destroying for example a LVDT sensor. The abovementioned method for generating measuring points is useful both when the tool is fixedly mounted in the room, and on the robot. The method can also be useful for calibration of surrounding equipment in a robot cell to the cell geometry of the CAD system.

At manual programming of surface scanning, or at surface scanning jogging, there is also the application a process model, or a process database, uses the read geometry for calculation of optimal process data, without generating the robot program from a CAD system. For example, a simple surface scanning may produce the join data required for automatic adjustment of optimal arc welding parameters, such as welding current, voltage, process velocity and oscillation.

In the case when you have smooth surfaces it is not necessary to go down with a measuring movement, and sample the position of the surface in discrete measuring points. Instead, the sensor can be moved over the surface and meanwhile continuous measuring is made. However, this requires a sensor of LVDT type with possibilities for continuous measuring. This method is even necessary for accurate measuring of critical discontinuities, such as for example an over lapping joint, wherein the scanning is performed from the upper surface to the lower.

The invention is not limited to the embodiments shown, but can be varied and modified within the frame of the following claims.

The invention claimed is:

1. A method for programming an industrial robot to move relative to defined positions on an object, wherein the programming is based on a geometric model of the object, the method comprising:
   registering and storing a plurality of measuring points, each measuring point corresponding to a point on a surface of the object expressed in a coordinate system associated with the robot;
   calculating one or a plurality of characteristic parameters for a plurality of different parts of the object based on the geometrical model of the object;
   determining an orientation and position of the geometrical model of the object relative to said coordinate system associated with the robot by adapting the geometrical model of the object to the measuring points, wherein adapting the geometrical model of the object to the measuring points comprises adapting measuring points belonging to a certain part of the object to the defined positions on a corresponding part of the geometrical model;
   determining to which part of the object a measuring point belongs based on said characteristic parameters;
   calculating a deviation between the measuring points and corresponding points on the geometrical model for at least some of the measuring point;
   adjusting said defined positions based on said calculated deviations; and
   providing the adjusted defined positions to a control system of the robot to be used for controlling the robot.

2. The method according to claim 1, wherein said parts comprise surfaces and edge lines of the object.

3. The method according to claim 1, further comprising:
   providing geometric models for a plurality of different objects,
   calculating a plurality of characteristic parameters for each of the objects based on the geometrical model of the object, and
   determining to which of the objects the measuring points belong based on the measuring points and said characteristic parameters.

4. The method according to claim 1, wherein said characteristic parameters comprise the normal direction relative to the surface of the object and the bending of the surface of the object.

5. The method according to claim 1, wherein the geometrical model of the object and the measuring points are adapted to each other by minimizing the distance between the measuring points and corresponding points on the geometrical model of the object.

6. The method according to claim 1, wherein the surfaces of the object are divided into a plurality of sub-surfaces, each comprising at least one measuring point, calculating a correction vector based on the deviation between the measuring point/measuring points in the sub-surface and corresponding point/points on the geometrical model of the object, and adjusting said defined positions based on the correction vectors for sub-surfaces belonging to the positions.

7. The method according to claim 1, wherein the edge lines of the object are divided into a plurality of line segments, each comprising at least one measuring point, calculating a correction vector based on the deviation between the measuring point/measuring points in the line segment and corresponding point/points on the geometrical model of the object, and adjusting said defined positions based on the correction vectors for line segment in the vicinity of the defined positions.

8. The method according to claim 1, wherein said defined positions are defined relative to the geometrical model and that the defined positions are transformed to said associated coordinate system based on the determined orientation and position of the geometrical model relative to the coordinate system associated with the robot.

9. The method according to claim 1, wherein said measuring points correspond to the positions of the robot when a predetermined point on a tool, or a measuring device corresponding to the current tool, is in contact with different points on the surface of the object.

10. The method according to claim 1, wherein the method comprises generating a surface-scanning program for automatically controlling the movements of the robot during measuring of said measuring points.

11. The method according to claim 10, wherein the positions of the measuring points are determined off-line based on the geometrical model of the object.

12. The method according to claim 10, wherein the method comprises that a number of positions, comprising at least one start position and one stop position are measured on the surface of the real object and that the positions of the measuring points are automatically generated based on the measured positions.

13. The method according to claim 10, wherein a sensor is mounted on a tool or on a measuring device corresponding to the current tool and that the sensor cooperates with the robot during generation of said measuring points.

14. The method according to claim 13, wherein the surface scanning program controls the movements of the robot during measuring of the measuring points, wherein said movements comprises moving the robot so that the sensor is in contact with the surface of the object during the measuring and that the robot thereafter is moved to a transfer point positioned at a distance from the surface of the object.

15. The method according to claim 13, wherein the orientation of the tool in the defined positions are stored and that the program is generated so that the tool or said measuring device have about the same orientation in a measuring point as the stored orientation.

16. A computer program product, comprising:
   a readable medium; and
   computer program instructions recorded on the computer readable medium and executable by a processor to carry out the steps of:
   registering and storing a plurality of measuring points, each measuring point corresponding to a point on a surface of an object expressed in a coordinate system associated with an industrial robot,
   calculating one or a plurality of characteristic parameters for a plurality of different parts of the object based on a geometrical model of the object, determining an orientation and position of the geometrical model of the object relative to said coordinate system associated with the robot by adapting the geometrical model of the object to the measuring points, wherein adapting the geometrical model of the object to the measuring points comprises adapting measuring points belonging to a certain part of the object to the corresponding part of the geometrical model, determining to which part of the object a measuring point belongs based on said characteristic parameters, calculating a deviation between the measuring points and corresponding points on the geometrical model for at least some of the measuring points, adjusting said defined positions based on said calculated deviations, and providing the adjusted defined positions to a control system of the robot to be used for controlling the robot.

17. A system for programming an industrial robot to move relative to defined positions on an object, wherein the system comprises a geometric model of the object, the real object, an industrial robot, wherein the real object and the robot are arranged to that it is possible to, by means of the robot, generate a plurality of measuring points corresponding to different points on the surface of the real object expressed in a coordinate system associated with the robot, a calibration module arranged to determine orientation and position of the geometrical model of the object relative to said coordinate system associated with the robot by adapting the measuring points to the geometrical model of the object, a part classification module arranged to calculate one or a plurality of characteristic parameters for a plurality of different parts of the object, based on the geometrical model for the object, and to determine to which part of an object a measuring point belongs, based on said characteristic parameters, wherein said calibration module is adapted to execute said adaptation of the geometrical model of the object to the measuring points by adapting the measuring points belonging to a certain part of the object to a corresponding part of the geometrical model, a calculating module arranged to receive the measuring points and corresponding points from the calibration module to calculate the deviation between the measuring points and corresponding points on the geometrical model, and a control system comprising an adjusting module arranged to receive the deviation from the calculating module and to adjust said defined positions based on said calculated deviations and direct movement of the robot to the adjusted defined positions.

18. The system according to claim 17, wherein said parts comprise surfaces and edge lines of the object.

19. The system according to claim 17, further comprising: geometric models for a plurality of different objects and an object classification module arranged to calculate a plurality of characteristic parameters for each of the objects based on the geometrical model of the objects and to determine to which of the different objects the measuring point belongs based on the measuring points and the calculated characteristic parameters.

20. The system according to claim 17, wherein said characteristic parameters comprise the normal direction relative to the surface of the object and the bending of the surface of the object.

21. The system according to claim 17, wherein said calibration module is arranged for adapting the geometrical model of the object and the measuring points to each other by minimizing the distance between the measuring points and corresponding points of the geometrical model of the object.

22. The system according to claim 17, wherein said adjusting module comprises means for dividing the surfaces of the object into a plurality of sub-surfaces, each comprising at least one measuring point and the adjusting module is arranged to calculate a correction vector for the sub-surfaces based on the deviation between the measuring point/measuring points of the sub-surface and corresponding point/points on the geometrical model of the object, and to adjust said defined positions based on the correction vectors for the sub-surfaces to which the positions belong.

23. The system according to claim 17, wherein said adjusting module comprises means for dividing the edge lines of the object into a plurality of line segments, each comprising at least one measuring point and the adjusting module is arranged to calculate a correction vector for each line segment based on the deviation between the measuring point/measuring points in the line segment and corresponding point/points on the geometrical model of the object and to adjust said defined positions based on the correction vectors for the line segment in the vicinity of the defined positions.

24. The system according to claim 17, wherein said defined positions are defined relative to the geometrical model, wherein said adjusting module comprises means for transforming said defined positions to said coordinate system associated with the robot, based on the determined orientation and position of the geometrical model relative to a said coordinate system.

25. The system according to claim 17, further comprising:
a measuring device adapted for being in contact with the surface of the object during measuring, wherein the measuring device has a center point corresponding to the tool center point of the current tool.

26. The system according to claim 25, wherein the measuring device is adapted to, at contact with the object, submit a signal, and that the system is adapted to, in reply to said signal, generate at least one measuring point based on the robot position.

27. The system according to claim 17, further comprising:
a program generator, arranged for generating a surface scanning program for automatically controlling the movement of the robot during measuring of said measuring points.

28. The system according to claim 27, wherein said program generator is arranged for automatically generate said surface scanning program based on certain input from an operator.

29. The system according to claim 27, wherein the program generator is arranged in an external computer and wherein the program generator is arranged to determine the positions of the measuring points based on the geometrical model of the object.

30. The system according to claim 27, wherein the program generator is arranged in the control system of the robot and that the program generator is arranged for generating the positions of the measuring points based on a plurality of positions measured at the surface of the real object, which positions comprise at least one start position and one stop position.

31. The system according to claim 27, further comprising: a sensor mounted on a tool, or a measuring device corresponding to the current tool, and wherein the sensor is arranged to cooperate with the robot for generating said measuring points.

32. The system according to claim 31, wherein said sensor is a position sensor arranged for measuring the distance between the surface of the object and any part of the robot.

33. The system according to claim 31, wherein the surface scanning program controls the movement of the robot during measuring of the measuring points, wherein said movements comprises that the robot is moved so that the sensor is in contact with the surface of the object during the measuring and that the robot thereafter is moved to a transfer point being positioned at a distance from the surface of the object.

34. A method for programming an industrial robot to move relative to defined positions on an object, wherein the programming is based on a geometric model of the object, the method comprising:
registering and storing a plurality of measuring points, each measuring point corresponding to a point on a surface of the object expressed in a coordinate system associated with the robot;
providing geometric models for a plurality of different objects;
calculating a plurality of characteristic parameters for each of the objects based on the geometrical model of the object;
determining to which of the objects the measuring points belong based on the measuring points and said characteristic parameters;
determining an orientation and position of the geometrical model of the object relative to said coordinate system associated with the robot by adapting the geometrical model of the object to the measuring points, wherein adapting the geometrical model of the object to the measuring points comprises adapting measuring points belonging to a certain part of the object to the defined positions on a corresponding part of the geometrical model;
calculating a deviation between the measuring points and corresponding points on the geometrical model for at least some of the measuring point;
adjusting said defined positions based on said calculated deviations; and
providing the adjusted defined positions to a control system of the robot to be used for controlling the robot.

35. A computer program product, comprising:
a readable medium; and
computer program instructions recorded on the computer readable medium and executable by a processor to carry out the steps of:
registering and storing a plurality of measuring points, each measuring point corresponding to a point on a surface of an object expressed in a coordinate system associated with an industrial robot,
providing geometric models for a plurality of different objects,
calculating a plurality of characteristic parameters for each of the objects based on a geometrical model of the object,
determining to which of the objects the measuring points belong based on the measuring points and said characteristic parameters,
determining an orientation and position of the geometrical model of the object relative to said coordinate system associated with the robot by adapting the geometrical model of the object to the measuring points, wherein adapting the geometrical model of the object to the measuring points comprises adapting measuring points belonging to a certain part of the object to the defined positions on a corresponding part of the geometrical model,
calculating a deviation between the measuring points and corresponding points on the geometrical model for at least some of the measuring point,
adjusting said defined positions based on said calculated deviations, and
providing the adjusted defined positions to a control system of the robot to be used for controlling the robot.

* * * * *